(12) United States Patent
Brommer

(10) Patent No.: US 8,089,946 B2
(45) Date of Patent: Jan. 3, 2012

(54) BANDWIDTH EFFICIENT WIRELESS NETWORK MODEM

(75) Inventor: Karl D. Brommer, Exeter, NH (US)

(73) Assignee: Collision Technology, LLC, Peterborough, NH (US)

( * ) Notice: Subject to any disclaimer, the term of this patent is extended or adjusted under 35 U.S.C. 154(b) by 0 days.

(21) Appl. No.: 12/548,502

(22) Filed: Aug. 27, 2009

(65) Prior Publication Data

US 2009/0310619 A1    Dec. 17, 2009

Related U.S. Application Data

(62) Division of application No. 10/529,019, filed on Mar. 24, 2005, now Pat. No. 7,599,346.

(51) Int. Cl.
*H04B 7/216* (2006.01)
*H04B 1/00* (2006.01)
*H04B 1/38* (2006.01)
*H04J 3/16* (2006.01)
*H04W 4/00* (2009.01)
*H04W 72/00* (2009.01)

(52) U.S. Cl. ........ 370/346; 370/342; 370/328; 375/147; 375/220; 375/222; 455/552.1; 455/434

(58) Field of Classification Search .................. 370/346, 370/342, 328; 375/147, 220, 222; 455/552.1, 455/434
See application file for complete search history.

(56) References Cited

U.S. PATENT DOCUMENTS

| | | | |
|---|---|---|---|
| 4,580,276 A | 4/1986 | Andruzzi, Jr. et al. | |
| 4,750,171 A | 6/1988 | Kedar et al. | |
| 4,794,635 A | 12/1988 | Hess | |
| 5,365,516 A | 11/1994 | Jandrell | |
| 5,530,437 A | 6/1996 | Goldberg | |
| 5,546,379 A | 8/1996 | Thaweethai et al. | |
| 5,596,439 A | 1/1997 | Dankberg et al. | |
| 5,652,866 A | 7/1997 | Aldred et al. | |
| 5,659,787 A | 8/1997 | Schieltz | |
| 5,752,164 A | 5/1998 | Jones | |
| 5,894,500 A | 4/1999 | Bruckert et al. | |
| 5,987,061 A | 11/1999 | Chen | |
| 6,052,364 A | 4/2000 | Chalmers et al. | |
| 6,061,406 A | 5/2000 | Carson et al. | |
| 6,097,707 A | 8/2000 | Hodzic et al. | |
| 6,185,197 B1 | 2/2001 | Cheung Yeung et al. | |
| 6,226,277 B1 | 5/2001 | Chuah | |
| 6,240,099 B1 | 5/2001 | Lim et al. | |

(Continued)

FOREIGN PATENT DOCUMENTS

JP    63-051742    3/1988

(Continued)

OTHER PUBLICATIONS

Ostergaard, Rolf V., "Cable-Modems.Org: The Cable Modem Reference Guide", May 2003, pp. 1-2, Rolf V. Ostergaard.

(Continued)

*Primary Examiner* — Ariel Balaoing
(74) *Attorney, Agent, or Firm* — Olive Law Group, PLLC

(57) ABSTRACT

A modem that provides efficient use of wireless network bandwidth in the presence of multiuser interference and noise is disclosed. The modem design provides for compatibility with existing network hardware and protocols so that new efficient modems may be added to the network without removing installed hardware and software.

20 Claims, 19 Drawing Sheets

U.S. PATENT DOCUMENTS

| | | | |
|---|---|---|---|
| 6,408,019 B1 | 6/2002 | Pickering et al. | |
| 6,414,964 B1 | 7/2002 | Holmquist et al. | |
| 6,417,672 B1 | 7/2002 | Chong | |
| 6,529,488 B1* | 3/2003 | Urs et al. | 370/330 |
| 6,535,554 B1 | 3/2003 | Webster et al. | |
| 6,535,716 B1 | 3/2003 | Reichman et al. | |
| 6,567,416 B1 | 5/2003 | Chuah | |
| 6,636,603 B1 | 10/2003 | Milbrandt | |
| 6,665,308 B1 | 12/2003 | Rakib et al. | |
| 6,782,277 B1 | 8/2004 | Chen et al. | |
| 6,870,808 B1 | 3/2005 | Liu et al. | |
| 7,023,868 B2 | 4/2006 | Rabenko et al. | |
| 7,050,419 B2 | 5/2006 | Azenkot et al. | |
| 7,120,123 B1 | 10/2006 | Quigley et al. | |
| 2001/0053132 A1 | 12/2001 | Attimont et al. | |
| 2002/0061031 A1 | 5/2002 | Sugar et al. | |
| 2002/0073432 A1 | 6/2002 | Kolze | |
| 2002/0126650 A1* | 9/2002 | Hall et al. | 370/349 |
| 2002/0154620 A1 | 10/2002 | Azenkot et al. | |
| 2002/0163933 A1 | 11/2002 | Benveniste | |
| 2002/0176392 A1* | 11/2002 | Reznik et al. | 370/342 |
| 2003/0048834 A1* | 3/2003 | Feher | 375/219 |
| 2003/0179742 A1 | 9/2003 | Ogier et al. | |

FOREIGN PATENT DOCUMENTS

| | | |
|---|---|---|
| JP | 03-044234 | 2/1991 |
| JP | 08-065269 | 3/1996 |
| JP | 11340952 | 12/1999 |
| JP | 2000115028 | 4/2000 |
| JP | 2000505629 | 5/2000 |
| JP | 2000-252918 | 9/2000 |
| JP | 2002505042 | 2/2002 |
| JP | 2002359583 | 12/2002 |
| JP | 2003500974 | 1/2003 |
| WO | 9428642 | 12/1994 |
| WO | 9507578 | 3/1995 |
| WO | 00/71843 | 11/2000 |
| WO | 0072455 | 11/2000 |

OTHER PUBLICATIONS

PCT International Search Report dated Aug. 2, 2002 of International Application No. PCT/US02/12401 filed Apr. 18, 2002.
PCT International Search Report dated Oct. 6, 2003 of International Application No. PCT/US03/17377 filed Jun. 2, 2003.
PCT International Search Report dated Jan. 9, 2004 of International Application No. PCT/US03/17449 filed Jun. 2, 2003.
Translation of Japanese Office Action; May 23, 2006, pp. 1-4, Mail No. 200047.
Bender, P.et al.; "CDM/HDR: A Bandwidth Efficient High Speed Wireless Data Service for Nomadic Users", Communications Magazine, IEEE, Jul. 2000, pp. 70-77, vol. 38, Issue 7.
Newton (Newton's Telecom Dictionary), 1998, pp. 230.
"Part II: Wireless LAN Medium Access Control (MAC) and Physical Layer (PHY) Specifications", IEEE, 1997, 2 pages.

* cited by examiner

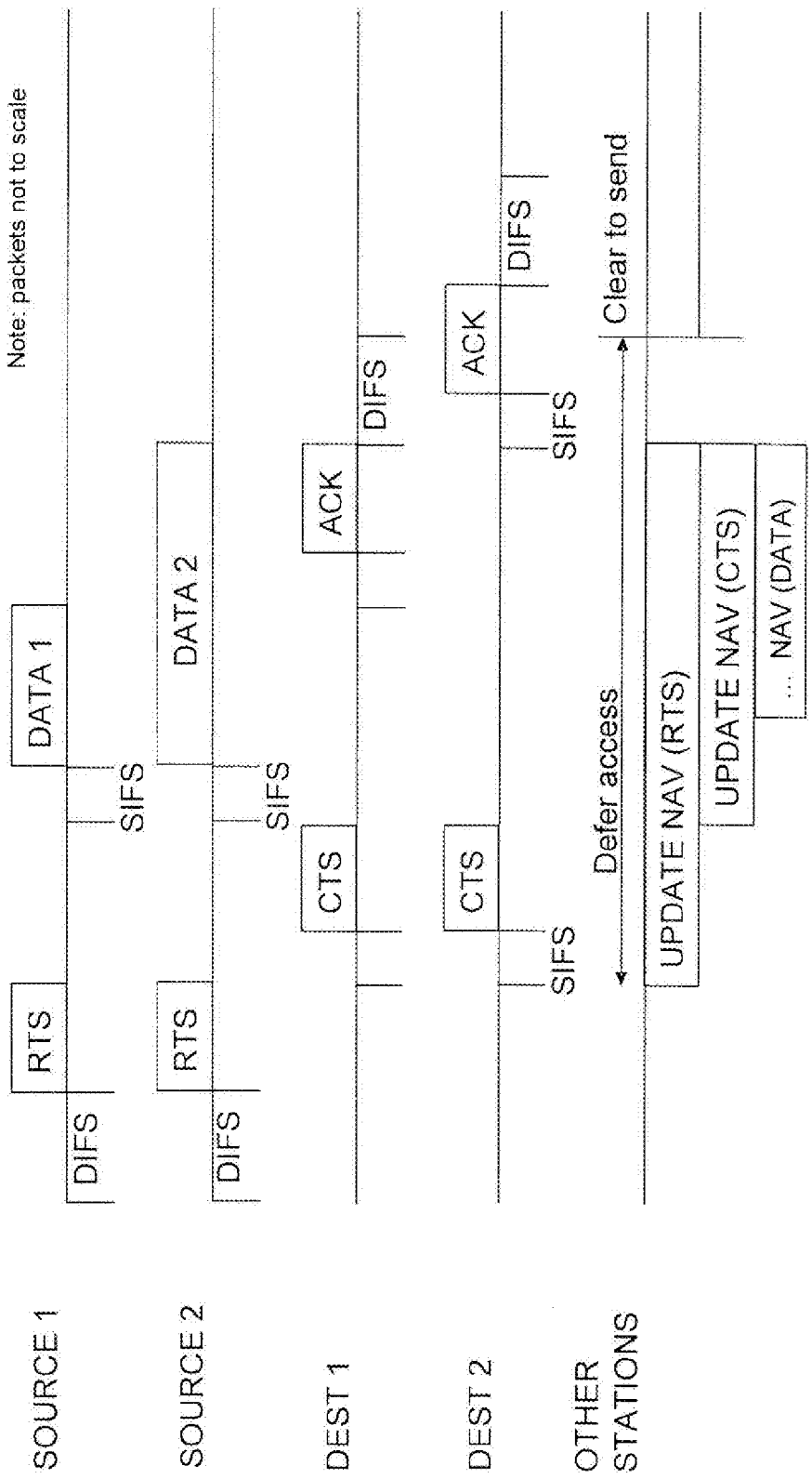

| OCTETS | | | | | | | |
|---|---|---|---|---|---|---|---|
| 2 | 2 | 6 | 6 | 6 | 2 | 6 | 0-2312 | 4 |
| FRAME CTL | DURATION CONN ID | ADDRESS | ADDRESS | ADDRESS | SEQ CONTROL | ADDRESS | FRAME BODY | CRC |

BITS — FRAME CONTROL FIELD ONLY

| 2 | 2 | 4 | 2 | 1 | 1 | 1 | 1 | 1 | 2 |
|---|---|---|---|---|---|---|---|---|---|
| PROTOCOL VERSION | TYPE | SUBTYPE | DS | LAST FRAG | RETRY | POWER MGMT | MORE DATA | EP |

Fig. 11

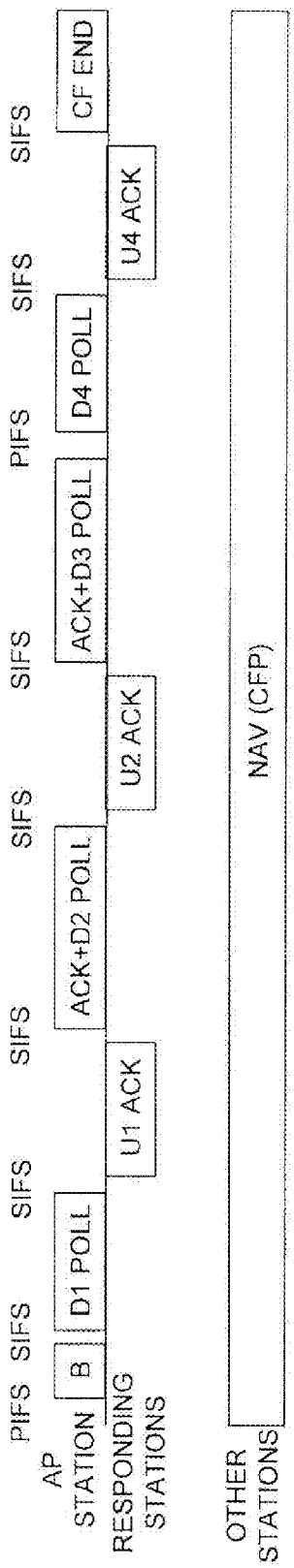
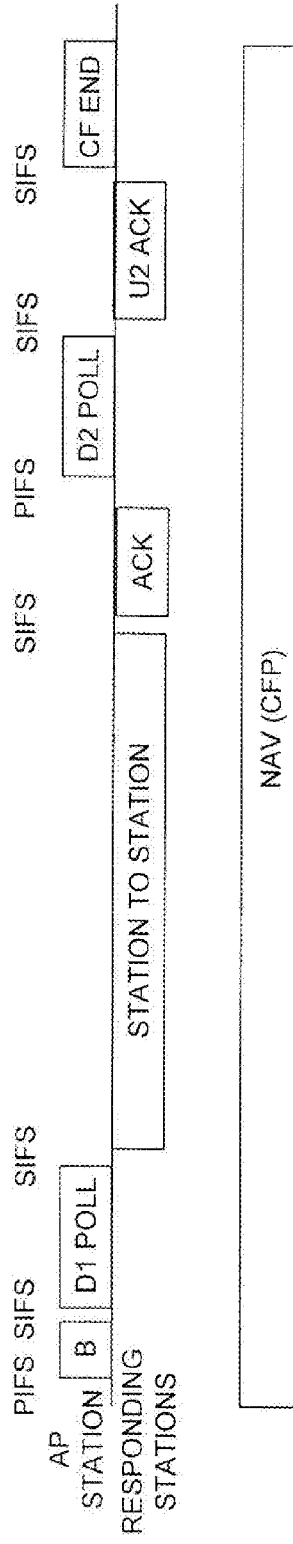
Fig. 16a
Fig. 16b

BANDWIDTH EFFICIENT WIRELESS NETWORK MODEM

RELATED APPLICATIONS

This application is a divisional of U.S. National Phase of PCT Application No. PCT/US03/17377 filed Jun. 2, 2003 and claims the benefit of U.S. Provisional Application No. 60/427,495, filed Nov. 19, 2002. In addition, PCT Application No. PCT/US03/17377 is related to PCT Application No. PCT/US03/17449, filed Jun. 2, 2003. Each of these applications is herein incorporated in its entirety by reference.

FIELD OF THE INVENTION

The invention relates to wireless networks, and more particularly, to a wireless digital signal demodulator and modulator for wireless networks where efficient use of allocated frequency bandwidth is desirable.

BACKGROUND OF THE INVENTION

Wireless networks are employed to facilitate the communication between computers and other electronic devices. Digitally modulated signals like binary phase shift keying (BPSK) or quadrature phase shift keying (QPSK) signals are transmitted between the various network nodes. Examples include satellite communications networks where terminals transmit through satellite transponders, terrestrial elements where terminals transmit through repeating towers and indoor local area networks where terminals transmit through central repeating elements or hubs. In each instance digital data is exchanged through wireless transmission with some control over the communications. The computer elements connected to these networks provide a variety of user services. Examples include telephone traffic with digital voice encoding, video conferencing, wide area computer network connectivity, and Internet service.

A variety of schemes exist for efficiently partitioning the network elements into communication channels. Frequency domain multiple access (FDMA) schemes assign each terminal to a separate, non-overlapping frequency band. Time domain multiple access (TDMA) schemes assign each terminal to a separate non-overlapping time slot. Code division multiple access (CDMA) schemes assign each terminal to a separate modulating waveform so that the cross correlation between each terminal is negligible. Each of these schemes is inefficient in the sense that, given sufficient signal to noise strength or coding redundancy, more communicators could use the allocated bandwidth if a means for detecting the excess signal margin and means for demodulating signals in the presence of interference was provided.

For instance, FDMA refers to a communication channel wherein a signal's transmission power is concentrated into a single radio frequency band. Interference from adjacent channels is limited by the use of band pass filters. However, for each channel being assigned a different frequency, system capacity is limited by the available frequencies and by limitations imposed by channel reuse. In TDMA systems, a channel consists of a time slot or frame in a periodic train of time intervals over the same frequency, with a given signal's energy confined to one of these time slots. Adjacent channel interference is limited by the use of a time gate or other synchronization element that only passes signal energy received at the proper time. However, the system capacity is limited by the available time slots as well as by limitations imposed by channel reuse, as each channel is assigned a different time slot.

One of the goals of FDMA and TDMA systems is to try and prevent two potentially interfering signals from occupying the same frequency at the same time. In contrast: CDMA techniques allow signals to overlap in both time and frequency. CDMA signals share the same frequency spectrum and in the frequency or time domain, the CDMA signals appear to overlap one another. The use of CDMA greatly increases the capacity compared to non-overlapped TDMA/FDMA systems and permits superior voice transmissions with a high bit rate decoder. CDMA also provides for variable data rates allowing many different grades of voice quality to be offered. Finally, the scrambled signal format of CDMA eliminates cross talk and makes it more difficult to eavesdrop or monitor calls therefore providing greater security.

In a CDMA system, each signal is transmitted using spread spectrum techniques. The transmitted informational data stream is impressed upon a much higher rate data stream termed a signature sequence. The bit stream of the signature sequence data is typically binary, and can be generated using a pseudo-noise process that appears random, but can be replicated by an authorized receiver. The informational data stream and the high bit rate signature sequence stream are combined by multiplying the two bit streams together, assuming the binary values of the two bit streams are represented by +1 or −1. This combination of the higher bit rate signature signal with the lower bit rate data stream is called spreading the informational data stream signal. Each informational data stream or channel is allocated a unique signature sequence.

In operation, a plurality of spread information signals, such as BPSK or QPSK signals, modulate a radio frequency (RF) carrier and are jointly received as a composite signal at the receiver. Each of the spread signals overlaps all of the other spread signals, as well as noise-related signals, in both frequency and time. The receiver correlates the composite signal with one of the unique signature sequences, and the corresponding information signal is isolated and despread.

A multiuser receiver would further improve signal density by permitting multiple communicators to share the same FDMA, TDMA, CDMA or other channel in cases where benign propagation conditions provide sufficient signal-to-noise margin. When margin exists, a functional multiuser receiver will successfully demodulate the desired transmitter in the presence of interfering transmitters sharing the same channel. There have been attempts at multiuser receivers, however these also have general deficiencies. One multiuser approach demodulates all user signals in an initial stage and forms an interference replica for each user. In subsequent processing all interference replicas except for the desired signal are subtracted from an input signal received to remove the interference. In the following stage, demodulation is made again about the desired signal by using a signal obtained by the initial stage. As a result, the user signal quality is improved as compared with the initial stage, and it is readily apparent that interference cancellation characteristic is gradually improved by repeating this process several times with a multistage structure. Another receiver employs a serial structure for canceling interference. When performing interference cancellation at each stage, the interference replica is transferred between stages and the interference replica is stored in memory. The deficiency here is that signals must have substantially different amplitudes for successive cancellation to be feasible. Since interfering amplitudes are arbitrary, this circumstance rarely occurs. Moreover, successive interference cancellation tends to distort the residual signal, and at some point, the cancellation process renders the signal of interest unrecoverable.

What is needed, therefore, is a bandwidth efficient wireless network modem capable of exploiting the channel densities possible with multiuser receivers. In a more general sense, there is a need for a wireless digital signal demodulator/modulator for wireless networks where efficient use of allocated frequency bandwidth is desirable.

BRIEF SUMMARY OF THE INVENTION

One embodiment of the present invention provides a method for polling and scheduling in a multiuser network that includes a plurality of bandwidth efficient modems configured in accordance with the principles of the present invention, with at least one modem designated as a polling point coordinator access point (AP) element. The method includes indicating the beginning of a contention-free period, and simultaneously transmitting on a single channel a first set of polling signals. Each polling signal corresponds to a particular terminal included in a first set of terminals included in the network. The method proceeds with receiving two or more simultaneous responses from the first set of polled terminals, and recovering each of those two or more simultaneous responses using co-channel demodulation capabilities of the AP element. The method may further include transmitting clear-to-send messages to any terminals requesting to send data, as indicated by received responses. Note that when the receiving modems contain multiuser receivers (MUD enabled), the AP element schedules multiple interfering data transmissions in the same channel, exploiting the ability of the multiuser receivers to demodulate signals in the presence of interference from other transmitters sharing the channel.

In one such embodiment, the recovering is followed by simultaneously transmitting acknowledgement signals to the responding terminals. The recovering may also be followed by simultaneously transmitting a next set of polling signals to a next set of two or more terminals, and receiving two or more simultaneous responses from the next set of polled terminals. When requested, data transmission channels are scheduled in accordance with the ability of modems to demodulate transmissions in the presence of interfering transmitters. Here, the method continues with recovering each of those two or more simultaneous responses using the co-channel demodulation capabilities of the AP element. These steps may be repeated, for example, until the end of the contention free period.

Another embodiment of the present invention provides a method for polling and scheduling in a multiuser network that includes a plurality of bandwidth efficient modems configured to carry out a distributed coordination function (DCF) for providing best-effort delivery of asynchronous packet data. The method includes two or more terminals simultaneously transmitting requests-to-send (RTS) messages on a single channel to a first set of destination modems, and simultaneously receiving clear-to-send (CTS) messages from the first set of destination modems at each of the requesting-to-send modems. Note that the destination terminals successfully demodulate the RTS messages by using multiuser receivers to remove the interfering signals in the channel. These destination terminals then simultaneously transmit clear to send (CTS) messages. The method proceeds with recovering each corresponding CTS message using co-channel demodulation capabilities of the corresponding requesting modem. The method continues with each requesting modem simultaneously transmitting its respective data on to the network, and each corresponding destination modem recovering the corresponding data using its co-channel demodulation capabilities. These steps may be repeated for one or more next sets of destination modems.

In one such embodiment, the method includes the preliminary steps of each modem detecting that one or more of the other modems included in the network are bandwidth efficient and therefore capable of an aggressive access protocol (which exploits co-channel demodulation capabilities), and switching from a legacy protocol mode to the bandwidth efficient aggressive access protocol mode for at least one pair of communicating modems included in the network. In another such embodiment, the method includes each modem adaptively learning modes of operation (e.g., legacy protocol mode and the bandwidth efficient aggressive access protocol mode) which each particular modem in the network is capable, and storing the learned modes operation.

Another embodiment of the present invention provides a modem which enables efficient use of bandwidth in a multiuser wireless network including a plurality of modems in the presence of interference and noise. The modem includes a multiuser detection module that is adapted to simultaneously demodulate and recover K wirelessly transmitted signals using co-channel demodulation. A data formatting module is operatively coupled to the multiuser detection module, and is adapted to produce network data packets for at least one of the K recovered signals. A control processor is operatively coupled to the formatting module, and is adapted to detect with which protocol mode the at least one of the K recovered signals was transmitted, and to enable a corresponding transmission mode including one of a legacy protocol mode and a bandwidth efficient aggressive access protocol mode that exploits co-channel demodulation capabilities of the modem. A demultiplexer is operatively coupled to the data formatting module and the control processor, and is adapted to select one of the recovered K wirelessly transmitted signals as a target signal intended for a user associated with the modem. The selection is based on a control input from the control processor. The modem may further include a front end that is adapted to simultaneously receive the K wirelessly transmitted signals, and to provide those signals in a form that facilitates their subsequent processing by the multiuser detection module.

In one such embodiment, the data formatting module supports multiple types of format modes, and the control processor is configured to select a formatting mode in which the data formatting module operates. In response to the control processor knowing that a modem with which it is communicating does not support the bandwidth efficient aggressive access protocol mode, the control processor may further be adapted to enable a legacy protocol mode there by providing backwards compatibility.

Another embodiment of the present invention provides a method for polling and scheduling in a multiuser network that includes a plurality of bandwidth efficient modems, with at least one modem designated as a polling point coordinator access point (AP) element that operates as a global timer. The method includes receiving a beacon signal from the AP element that indicates frame start, the frame having an interval. The method further includes monitoring current broadcasting activity of other modems included in the network so as to identify an open slot available for data transmission in a channel, where two or more modems can transmit in the channel at the same time. In response to identifying an open slot and being next in a transmission queue, the method proceeds with transmitting data in the open slot.

In one such embodiment, the transmission queue is based on a round robin scheme, where each modem included in the network is assigned a transmission priority. Alternatively, the transmission queue is based on priority information included in the beacon signal. The monitoring and transmission steps can be repeated until a global signal to end the frame is received from the AP element.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIG. 6 illustrates a timing diagram for network communication using an asynchronous distributed coordination function when some network elements employ co-channel demodulation in accordance with one embodiment of the present invention.

FIG. 11 illustrates a frame format in accordance with the IEEE 802.11 protocol.

FIG. 16 is a timing diagram that illustrates PCF polling, where a central access point can poll a network during a contention free period.

DETAILED DESCRIPTION OF THE INVENTION

Embodiments of the present invention provide a wireless digital signal demodulator/modulator for wireless networks where efficient use of allocated frequency bandwidth is desirable. In one particular embodiment, a bandwidth efficient wireless network modem is provided. The network may be, for example, a local area network (LAN), a wide area network (WAN), or any network enabling wireless modems to communicate with one another. The modem includes functions necessary to maintain interoperability with existing network devices. Before describing embodiments of the present invention, some background information on general wireless networks and configurations is provided in reference to FIGS. 8-16b.

General Wireless Network Requirements and Configurations

Requirements generally imposed on wireless networks include the allocation of a common frequency band for communication by the network elements. Current popular frequencies range from 900 MHz to 30 or more GHz. Means are generally provided to make the network resistant to interference from other radiofrequency sources intentionally or unintentionally transmitting at the same frequency. In some cases, the interference is due to other networks operating identical equipment on the same frequency. Spread spectrum techniques such as direct sequence modulation or frequency hopping may be employed to mitigate interference.

Figure 8:
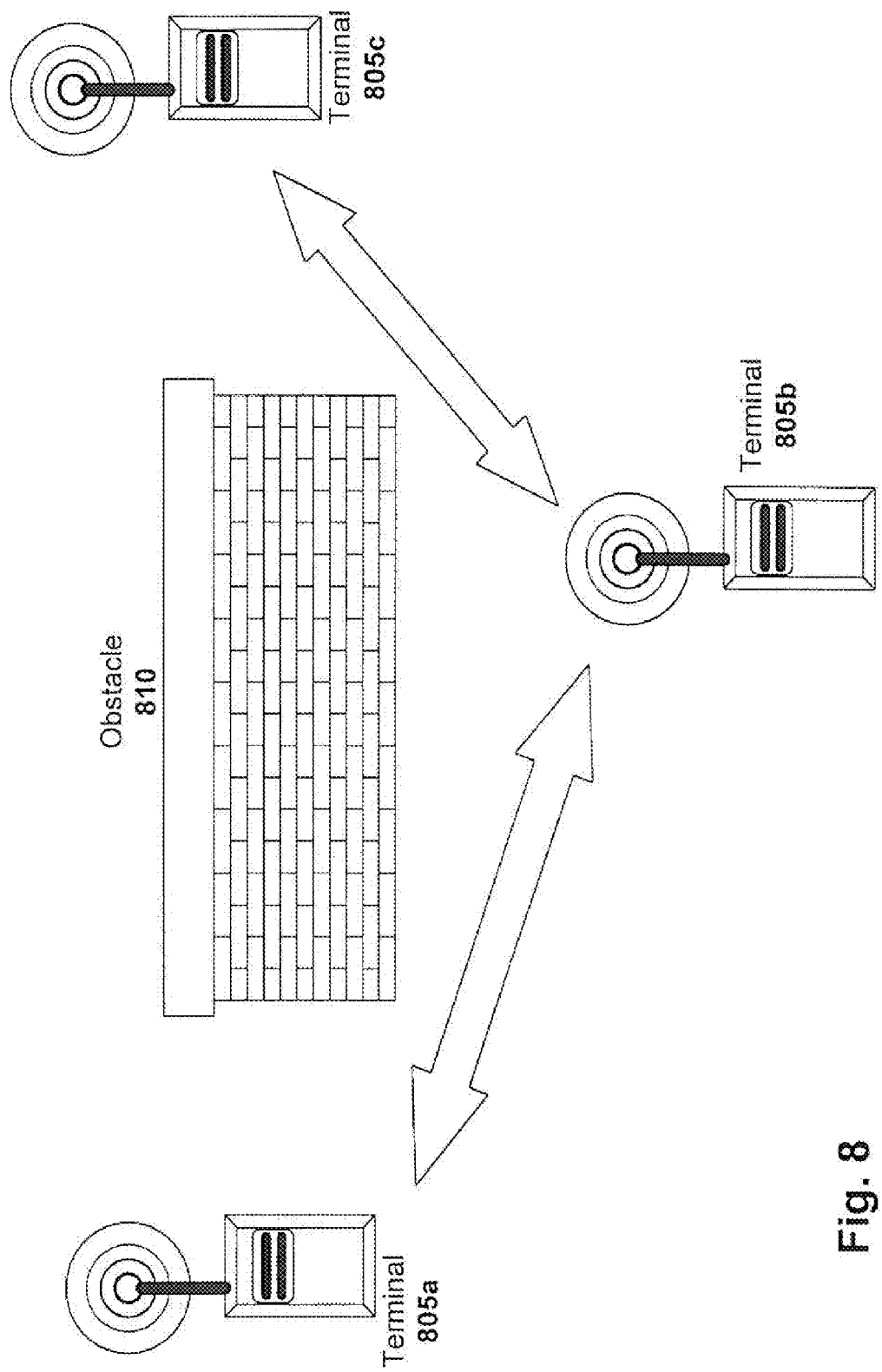
FIG. 8 illustrates an example of a hidden terminal configuration.

Another general requirement is that the network must provide means to handle situations where two network elements inadvertently transmit at the same time because they are unable to sense activity from every element in the network. This condition is referred to as the hidden terminal problem. An example of a hidden terminal configuration is shown in FIG. 8. Here, three terminals are communicating as parts of a distributed wireless network. Due to the presence of an obstacle 810, terminals 805a and 805c cannot communicate directly. Therefore if both terminals 805a and 805c attempt to transmit data to terminal 805b, they will be unable to detect the presence of each other's packets, leading to uncontrolled interference at terminal 805b. Such interference can be successfully handled by the present invention, a bandwidth efficient modem capable of simultaneously demodulating the two interfering signals.

Another general requirement is that network receivers must be able to operate in the presence of degrading propagation including multipath fading, atmospheric attenuation and dispersion. In some networks these conditions are intensified by transmission from moving vehicles. Common bit error requirements are $10^{-2}$ for voice packets, and $10^{-5}$ for data packets. Automatic repeat request (ARQ) protocols and error correction codes are often used to increase reliability. Current network throughput rates are in the 1 to 20 million bits per second range for total capacity in an indoor wireless LAN. Rates of outdoor point-to-point networks and projected satellite networks will be significantly higher. Optical networks may transmit billions of bits per second. As technology improves, higher network throughputs are anticipated.

Each of these requirements is often imposed in a system with power constraints on small network elements. Therefore, efficient implementation is often also imposed.

Some contemporary networks employ multiple protocols to ensure compatibility among diverse network elements while providing means for efficient communication. For example, the IEEE 802.11 network protocol specifies a Distributed Coordination Function (DCF) providing best-effort delivery of asynchronous packet data. This protocol ensures that any network device is able to communicate with any other network device through an asynchronous data transfer mode. In addition, it is recognized that more efficient data transmission may be desired by all or some network elements. To provide this function, this particular network protocol also specifies a Point Coordination Function (PCF). This protocol is based on polling controlled by a network access point. It is designed for transmitting delay-sensitive data. The IEEE 802.11 specification for network-compatible receivers leaves the PCF optional. Details of the polling implementation are also left to the manufacturer.

Figure 9:
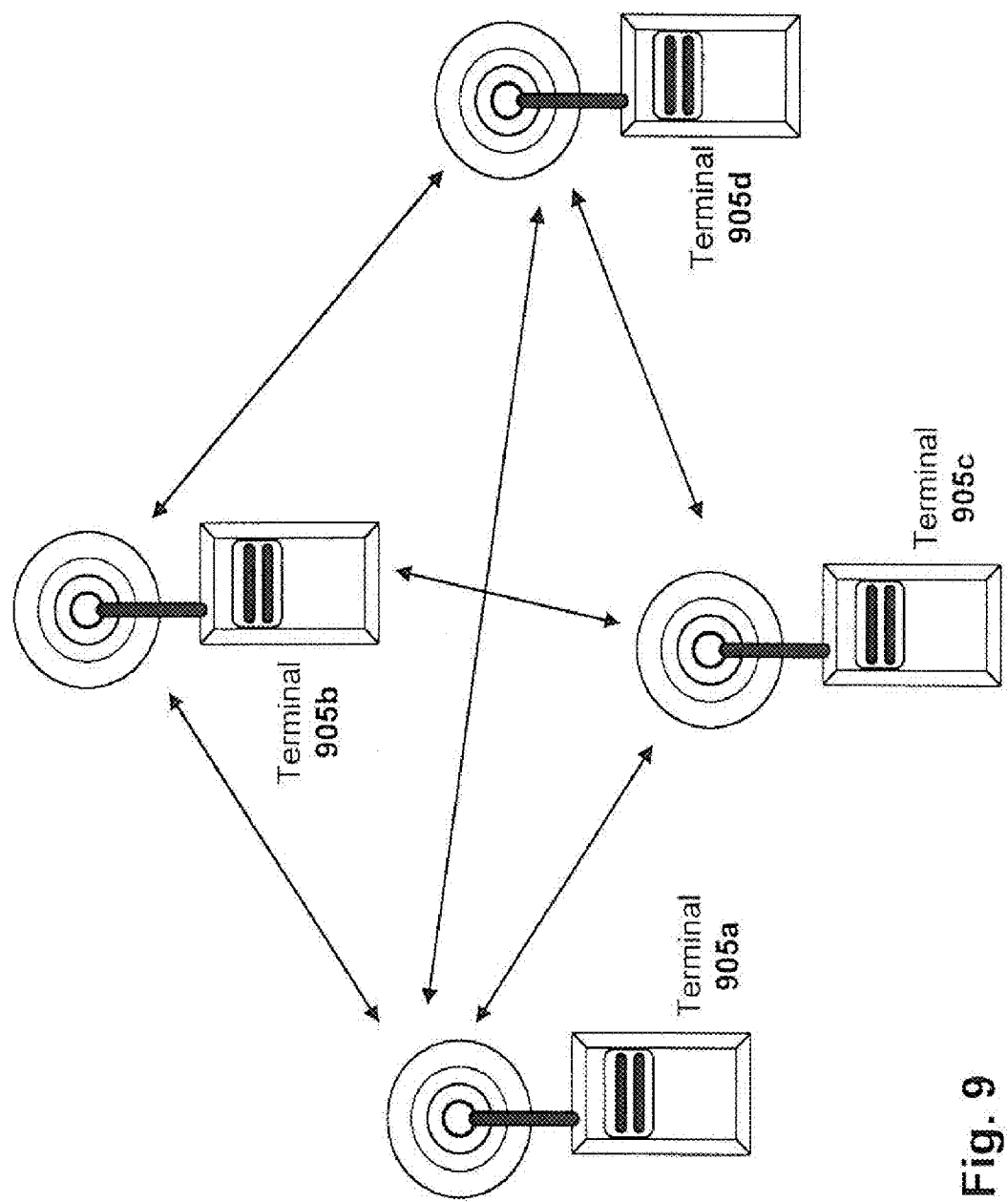
FIG. 9 illustrates a network having an 'ad hoc' organization with no central controlling element.

Many contemporary networks provide for 'ad hoc' organization with no central controlling element. An 'ad hoc' network is shown in FIG. 9. Here, a set of terminals 905a-d (sometimes referred to as a basic service set or BSS) is shown with wireless communication links connecting each terminal to the other terminals in the network. Examples of network terminals include personal computers, personal digital assistants, printers, cellular telephones, server computers, and multifunction devices. Examples of network services include electronic mail services, other message services, music services, data file services, and voice services.

In principle, all terminals in a wireless 'ad hoc' network are able to communicate with all other terminals. This means that each terminal should be in the field of regard of all other terminals in the network. It also means that the network protocol must include means for terminals to asynchronously page and respond to all other terminals in the network. For example in the IEEE 802.11 networks, the Distribution Coordination Function provides for self-assembly and inter-element communication without polling by a central network element. While the details of this scheme show efficiency disadvantages when compared to centralized networks, the benefit is that any set of devices compliant with the protocol may be configured into a network with successful data transfer.

Figure 10:
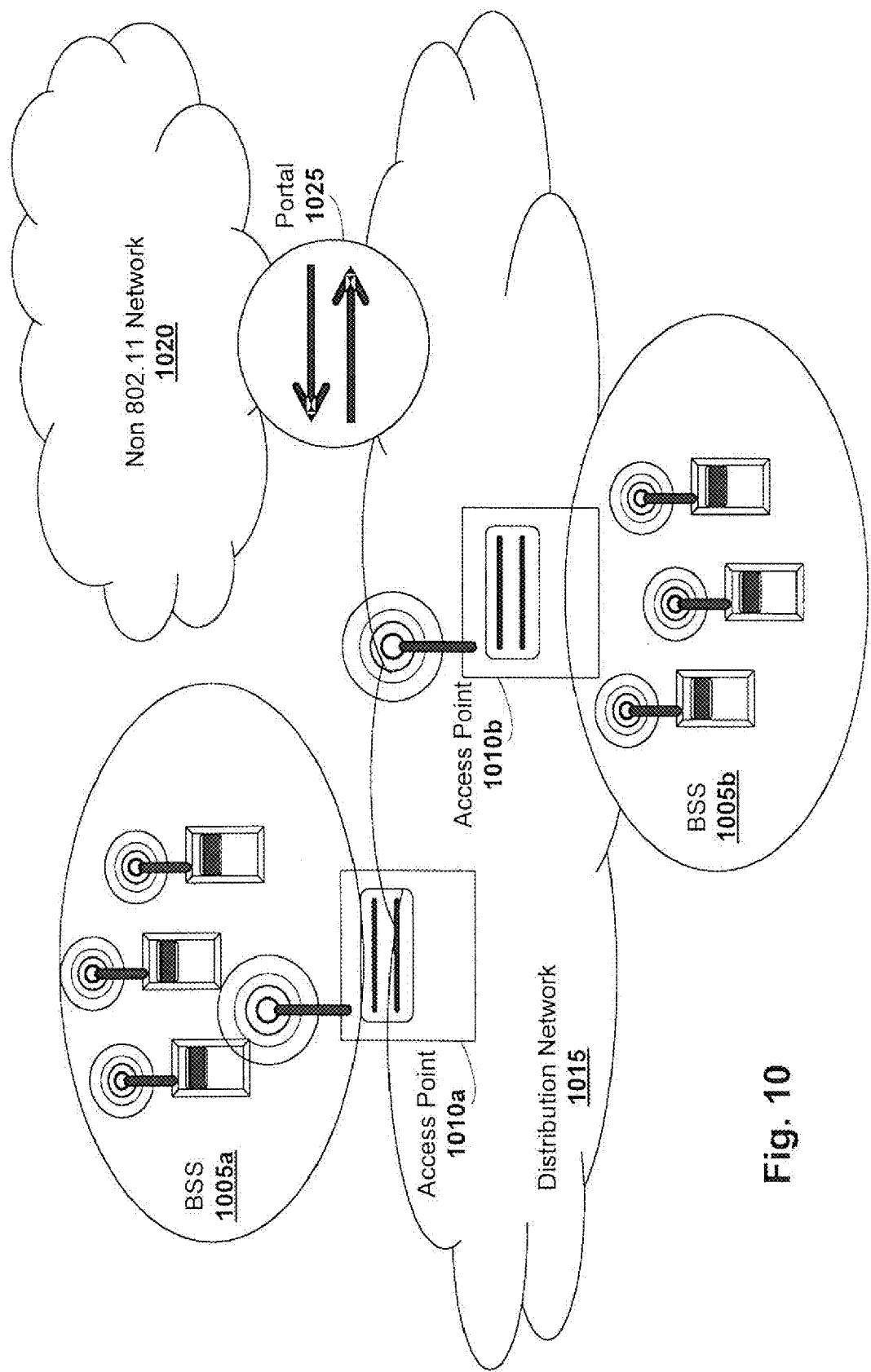
FIG. 10 illustrates a network having centralized access point organization.

Another aspect of contemporary networks is the need for centralized access points. While many networks allow peer-to-peer communication, others require communication through a centralized access point. An example is shown in FIG. 10. Here, a first set of terminals 1005a with wireless communication links is shown connecting each terminal to a first centralized access point 1010a. Likewise, a second set of terminals 1005b with wireless communication links is shown connecting each terminal to a second centralized access point 1010b. In addition, many terminals are able to communicate directly but it is not entirely necessary.

Each central access point 1010 polls each of its corresponding network elements 1005 to schedule communication slots for direct communication between any two network elements. Also, the central access points 1010 communicate with each other to forward data traffic from one BSS 1005 to another via the distribution network 1015. Such a configuration is sometimes referred to as an extended service set (ESS). In this example, network 1015 is further adapted with connectivity to wired or wireless elements outside the network 1015. This function is known as serving as a network portal. In this example, portal 1025 couples the network 1015 to a non 802.11 network 1020.

In terms of network topology, peer-to-peer connectivity is commonly referred to as a mesh architecture, while networks where elements communicate through centralized access points are often referred to as hub-and-spoke or star architectures. Wireless networks may be hub-and-spoke in the sense that central access points may perform network channel allocation. Even when centralized access points assign channels, communication is generally direct between network elements once channels have been assigned. However, indirect communication through the access point may also be provided by some protocols. Cellular telephone networks are based on star architectures with base terminals serving as central access points. In all networks, access to communications is an issue. In the case of mesh networks, propagation and interference may limit the ability to communicate outside the network. Equipment incompatibilities may also intentionally or unintentionally limit communication range.

In these cases, centralized access points provide means to communicate outside the network. These points extend network range by connecting to other networks otherwise inaccessible. In this sense they function as network bridges known as portals (e.g., portal 1025 of FIG. 10) in some applications. They also provide specific services that may not be otherwise available to the network elements. Finally centralized access points provide means for implementing point coordination functions and other specialized protocols within a basic peer-to-peer network.

A variety of physical layer waveforms may be used to transmit the packets. In addition to modulations previously discussed, spread spectrum techniques may be used, including frequency hopping, direct sequence modulation or other techniques like orthogonal frequency domain multiplexing. Infrared or optical carriers may be used in addition to radiofrequency carriers. In each case, it is the objective to transmit packets of data by wireless communication.

In one contemporary wireless LAN, the direct sequence spread spectrum communication technique employed is to apply 11 chips per symbols to either 1 Mbps differential binary shift key (DBPSK) or 2 Mbps enhanced quadrature phase shift key QPSK. In both cases, 11 chips/symbol spreading provides an 11 MHz channel bandwidth. In addition, 11 subchannels are defined through 11 different spreading sequences. Also, overlapping adjacent channels are separated by 30 MHz. Another variant of this LAN standard uses Orthogonal Frequency Division Multiplexing.

In the same LAN standard, the frequency hopping communication technique employed is a 79 channel hop set with 1 MHz spacing and 1 Mbps instantaneous bandwidth. The system uses 78 different hop sets, with a minimum hop rate of 2.5 hops/s. Two modulations are used for the individual hopped packets. Basic 1 Mbps is two-level Gaussian Frequency Shift Keyed (GFSK): with 1= fc+f, 0=fc−f. In words, a 'one' is denoted by transmission at frequency fc+f and a 'zero' is denoted by transmission at frequency fc−f, where fc represents the carrier frequency and f is the FSK offset frequency. An enhanced 2 Mbps rate is provided through four-level GFSK.

In the same LAN standard, the infrared communication technique achieves a 1 Mbps data rate through quaternary pulse position modulation (PPM), where two data bits are sent as four coded bits on transmission. There is also a 2 Mbps enhanced rate achieved through 6-ary PPM, where four data bits are sent as sixteen coded bits on transmission. In this system, the carrier is on the 850-950 nm wavelength. The system is designed for indoor use with non-directed transmissions using line-of-sight or reflections.

The part of the wireless LAN protocol concerned with efficient channel scheduling is known as the Medium Access Control function. This function performs channel allocation procedures, protocol data unit (PDU) addressing, frame formatting, error checking and packet fragmenting and reassembly. To maintain universal network access while also providing for high throughput access, two distinct functions are implemented.

The primary access function is through a so-called "contention mode" where all terminals contend for access to the channel for each packet transmitted. During contention service, each terminal with a packet queued for transmission must contend for access to the channel and release the channel as soon as the packet is sent. In addition, a system may alternate between contention mode during contention period (CP) and a contention-free period (CFP). During the CFP, a central access point controls medium access, eliminating-contention. However, not all network devices are capable of operating during the CFP, so a CP interval is also provided.

To provide for network control and data transfer, Medium Access Control (MAC) functions are supplied through three different types of packets, or frames. Management frames provide terminal association and dissociation with the central access point, timing and synchronization, and authentication and de-authentication. Control frames provide handshaking during the CP, positive acknowledgement during the CP, and indication of the end of the CFP. Finally, data frames provide data transmission during CP and CFP. An example packet format is shown in FIG. 11.

This packet is taken from the IEEE 802.11 protocol, but it shows essential functions common to all network protocols. The packet begins with synchronization bits necessary for network receiver elements to acquire the asynchronously transmitted packet. These synch bits are not shown in the figure, but precede the packet shown. Next follows a control signaling sequence necessary for correct packet interpretation. Its fields include protocol type, power control, packet type, fragmentation information, and similar network housekeeping functions. Next are bits indicating the duration of the packet. Next are address fields for identifying the intended recipient. Next comes the actual data embedded in the packet. Last comes the error correction bits.

During contention service, means must be provided to resolve conflicts between terminals simultaneously contending for access. One scheme is to allow terminals to transmit while requiring them to detect collisions with other terminals. However, in many if not most systems, collision detection is not used because terminals usually cannot receive while they transmit. In this case, terminals must sense activity before beginning to transmit so as to lower the probability of collisions.

This method is known as Carrier Sense Multiple Access with Collision Avoidance (CSMA/CA). It forms the basis of the distributed coordination function (DCF). Carrier sensing is performed both at the physical and MAC layers. A channel is marked busy if either the physical or virtual carrier sensing mechanisms detect activity. However, this method cannot eliminate collisions due to the previously mentioned hidden terminal problem: it is impossible for all terminals to hear traffic from all other terminals, due to obstacles, propagation effects and siting errors.

To minimize contention, networks employing CSMA/CA use both physical and virtual carrier sensing. Physical carrier sensing is performed through detection of the presence of other 802.11 wireless LAN users through packet analysis and through detection of received signal strength indications of other sources in the channel. Virtual carrier sensing is done through the MAC layer through several aspects of the protocol. One way is by using request-to-send (RTS) and clear-to-send (CTS) frames to verify channel access grants. Lack of CTS acknowledgement implies that another user is transmitting on the channel. Through propagation obstacles or through simultaneous transmission, physical detection of this carrier may not be possible. Another way is by including in the packet header a duration field telling other terminals in the network how to adjust their network timing data registers to indicate the time allocated for the current packet until the channel may again be sampled for idle status. This information is transmitted in the header of request-to-send (RTS) packets, clear-to-send (CTS) packets, and data packets.

Figure 12:
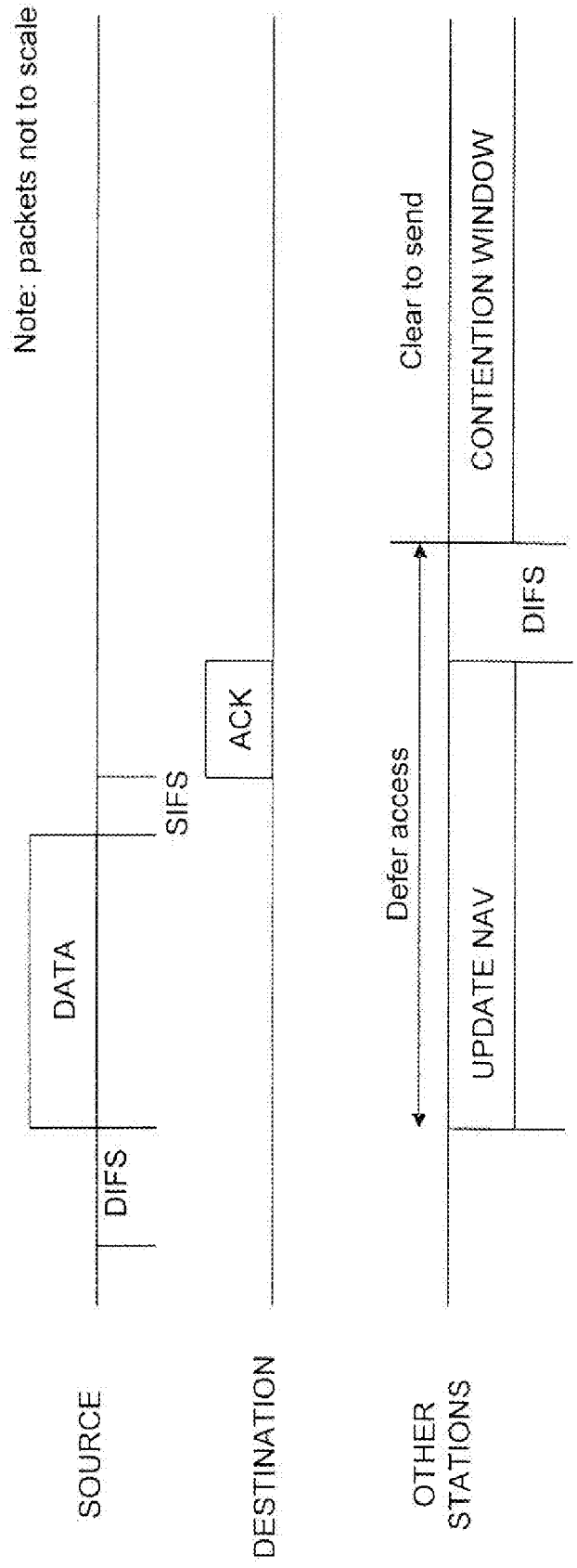
FIG. 12 illustrates a basic channel access method, where access to the medium is controlled using interframe space intervals between the transmission of frames.

The large size of data packets means that collisions waste much bandwidth. In addition to physical and virtual carrier detection, one additional means of reducing collision probability is to control access to the medium using interframe space intervals between the transmission of frames. The scheme is shown in FIG. 12. Three distinct network elements are shown: the transmitting terminal or source, the receiving terminal or destination, and the other terminals or stations in the network. When a terminal senses an idle channel, it waits for a specified period DIFS (distributed inter-frame spacing) and samples again. If still idle, it transmits a packet.

The receiving terminal calculates a checksum. If the packet was received correctly, this receiving terminal waits another specified period SIFS (short inter-frame spacing) and transmits a positive acknowledgement frame (ACK). In the absence of obstructions, interference and other system propagation limitations, all other network terminals are intended to detect the transmitted data packet, demodulate it and use the duration field to adjust their network timing registers (NAV), including the ACK interval. Each terminal must wait for a space interval DIFS after sensing a quiet network in order to minimize collision probabilities.

Figure 13:
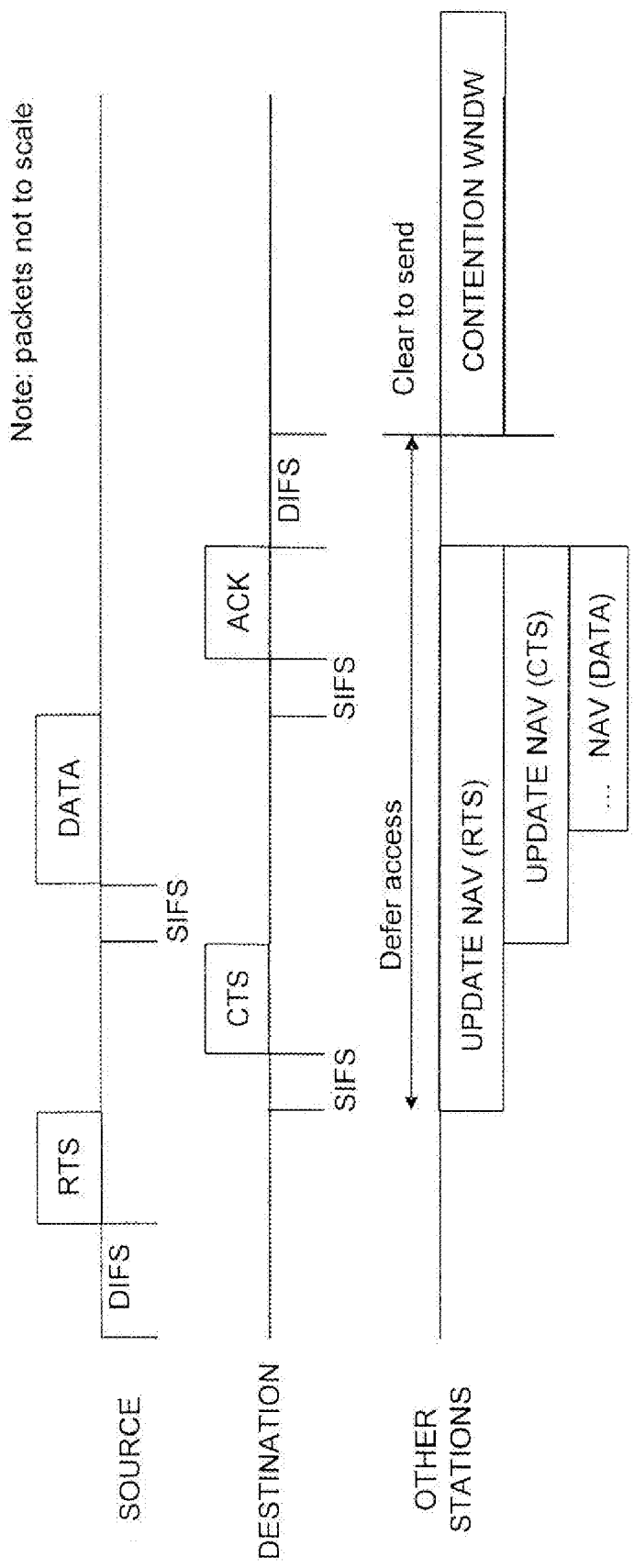
FIG. 13 is a timing diagram that illustrates the RTS/CTS protocol.

In addition to guard intervals, a request-to-send/clear-to-send protocol is used to reduce collisions. For example, the source sends a 20-byte RTS packet and the destination responds with a 14-byte CTS packet. Other terminals update their network timing registers based on this information. This scheme is shown in FIG. 13. In comparison to FIG. 12, this time the source or transmitting terminal sends the RTS packet after waiting appropriate intervals. The destination or receiving terminal answers with a CTS packet also after waiting appropriate intervals.

While this exchange consumes about 282 ms in a basic rate IEEE 802.11 protocol, it substantially reduces collision probability because the network timing data is encoded in both the RTS and CTS packets which are sent at different times by different devices. Therefore if one node is hidden from others in the network, at least there is a second node that may not be hidden. Collisions are more expensive during relatively long data packets compared to short RTS or CTS packets. After the RTS/CTS exchange, the transmitting terminal sends the data packet, followed by an ACK response from the receiving terminal if the transmission was successful.

The third line in the figure shows times during the exchange when other terminals in the network are able to update their network timing registers. As shown in FIG. 13, the RTS packet, the CTS packet, the data packet, and the ACK packet each present an independent opportunity for each element to obtain a timing update, thereby improving the reliability of the system.

Figure 14:
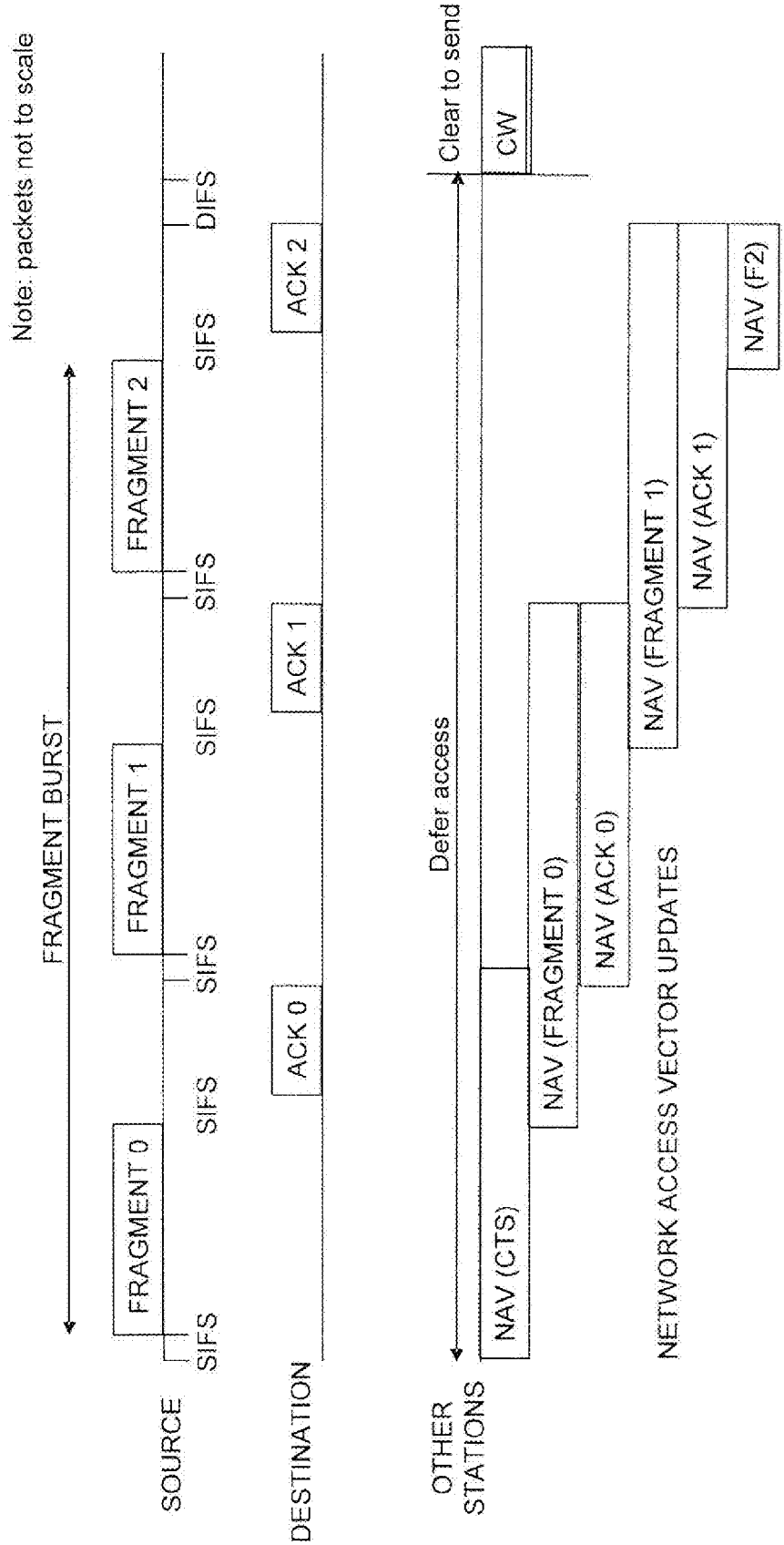
FIG. 14 is a timing diagram that illustrates fragment transmission for the transmission of large data blocks extending over multiple frame packets.

This method is modified for the transmission of large data blocks extending over multiple frame packets. This scheme is shown in FIG. 14. Terminals transmitting large data blocks must fragment the block into multiple packets, sending them consecutively with positive acknowledgement. If ACK is not received, the source releases the channel and recontends for access, beginning with the unacknowledged packet. The RTS/CTS protocol is only used for the first packet, as duration information is contained in each packet header. The third line in FIG. 14 shows times during the exchange when other terminals in the network are able to update their network timing registers. The RTS packet, the CTS packet, each data packet (e.g., fragment 0, 1, 2), and each ACK packet each present an independent opportunity for each element to obtain a timing update, thereby improving the reliability of the system.

If packets still collide (despite the precautions previously discussed), terminals use a random back-off procedure where a small random amount is added to the usual guard wait time. If the channel is clear after this interval, access is re-attempted. If collision still occurs, a new random back-off time is generated, then access is re-attempted yet again. A weakness of this method is the lack of a mechanism to guarantee minimum delay for time-bounded services.

Figure 15:
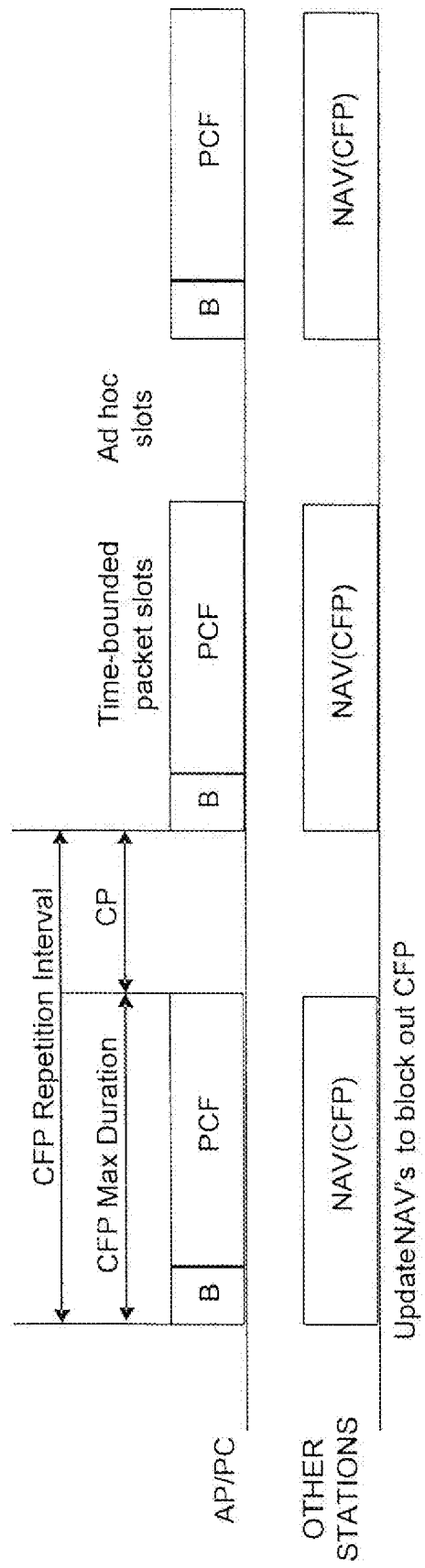
FIG. 15 is a timing diagram that illustrates a point coordination function, where contention-free frame transfer is provided by a polling point coordinator access point element.

One method of providing such a mechanism is through the optional contention-free frame transfer provided by a polling point coordinator access point (AP/PC) element, as shown in FIG. 15. Terminals capable of being polled and operating in the contention-free period (CFP) are CF-aware terminals. The polling method is left to the implementer. This Point Coordination Function (PCF) must coexist with the distributed coordination function (DCF). An adjustable parameter known as the CFP repetition interval determines the PCF frequency. An adjustable parameter known as the CFP max duration determines length of the PCF. A Beacon frame signal B initiates the CFP. The frame allocations are shown in FIG. 15. The network alternates between CFP and CP times. During CFP times, network elements block out their transmissions unless they are scheduled to transmit by the polling element. This is shown schematically on the "other stations" line of FIG. 15.

FIG. 16 shows two polling timing diagrams (16*a* and 16*b*), and is one example of how a central access point might poll a network during the contention free period. FIG. 16*a* shows the polling sequences for the case where no terminals responding to the polling (stations 1, 2 and 4) transmit data and one terminal (station 3) is not responding to the poll. FIG. 16*a* shows three time lines, one for the access point polling of the terminals, one for the terminals responding to polls, and one for all other terminals in the network.

The contention free period begins with a standard waiting guard time followed by transmission of the beacon packet (B) by the central access point terminal. All terminals receive this beacon and block out the contention free time in their network timing registers where asynchronous distributed coordination functions are not to be transmitted. After waiting the standard guard time SIFS to ensure no contention occurs, the access point broadcasts a polling packet (D1 POLL) to terminal 1. Terminal 1 receives and decodes this packet, waits the standard guard time SIFS, then broadcasts back an ACK packet (U1 ACK) indicating that it has no data to send.

The access point now broadcasts an ACK followed by a polling packet to terminal 2 (ACK+D2 POLL). The extra ACK packet is to increase the probability that other terminals in the network hear the transaction with terminal 1, due to the hidden terminal problem. Similar to terminal 1, terminal 2 has no data to send so it waits the guard time, the broadcasts an ACK packet (U2 ACK). The access point proceeds to transmit an ACK followed by a polling packet to terminal 3 (ACK+D3 POLL). Terminal 3 does not respond as it is powered down, cannot hear the broadcast, or has some other problem. In such a case, the access point waits a longer standard guard time PIFS (point inter-frame spacing), then proceeds to poll terminal 4 by transmitting a polling packet (D4 POLL). Terminal 4 responds with an ACK packet (U4 ACK). At this point the contention free period has nearly elapsed, so the access point broadcasts the CF END packet, indicating the end of the contention-free period.

FIG. 16*b* shows a variation where terminal 1 transmits data in response to the poll. In this instance, the contention free period begins as in FIG. 16*a*, with the central access point broadcasting the beacon packet (B) followed by the polling packet (D1 POLL) to terminal 1. This time, terminal one responds with a terminal-to-terminal data packet (STATION TO STATION). Other terminals will receive this broadcast from terminal 1. The intended recipient will decode its destination address in the packet header and then recover the data.

Terminal 1 then sends an ACK packet (ACK) indicating that it has completed transmission. The intended recipient must wait until it is polled at some later time before it can acknowledge receipt of data from terminal 1. The central access point then polls terminal 2 in the manner used for terminal 1 and all other terminals (D2 POLL). Terminal 2 responds with an ACK packet (U2 ACK) indicating that it has no data to transmit. At this point the contention free period has nearly elapsed, so the access point broadcasts the CF END packet, indicating the end of the contention-free period.

With this background information on wireless networks and configurations in mind, embodiments of the present invention will now be described in reference to FIGS. 1-7.

Bandwidth Efficient RF Modem

Figure 1:
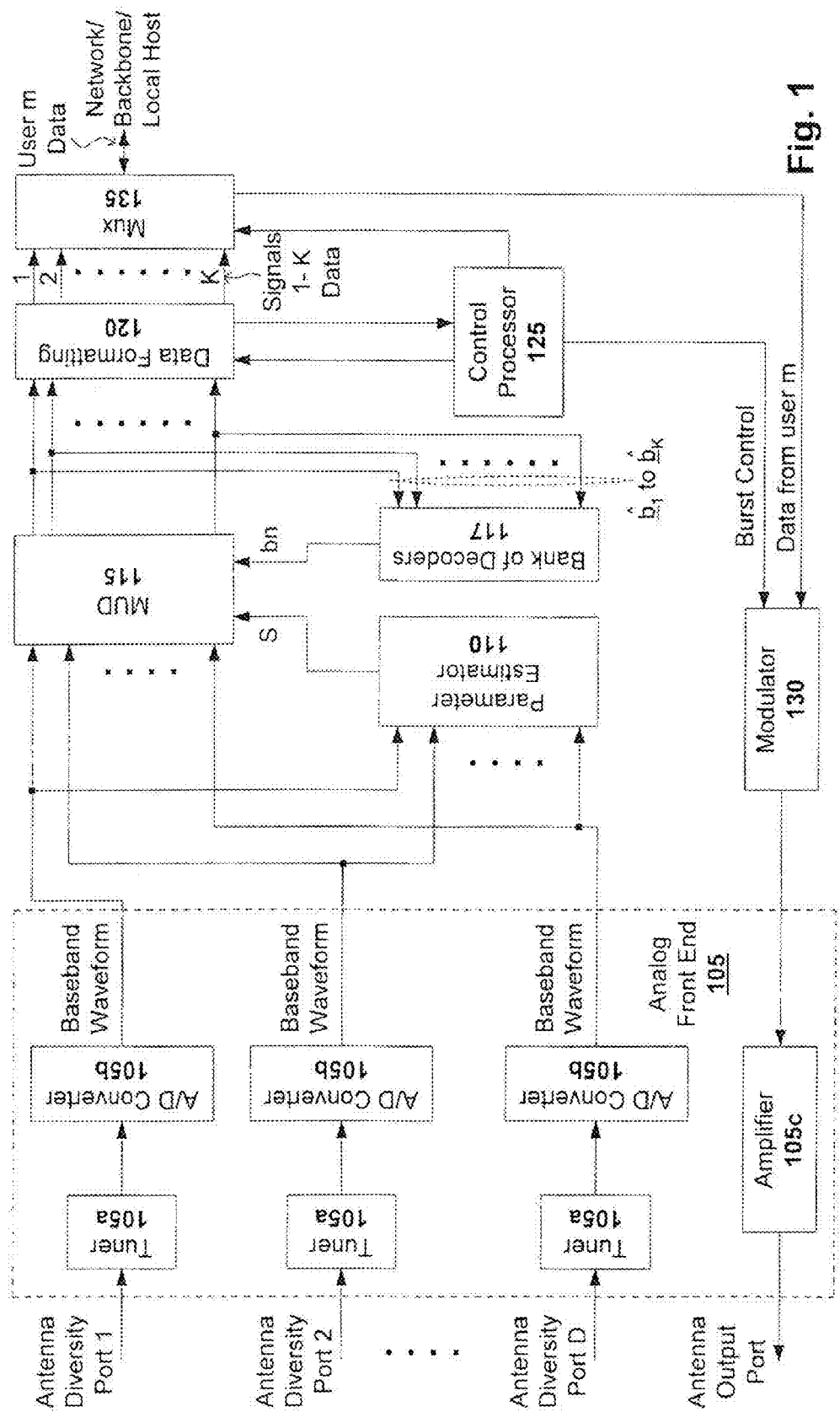
FIG. 1 illustrates a block diagram of a modem configured for demodulating/modulating co-channel signals in the radiofrequency band in accordance with one embodiment of the present invention.

FIG. 1 illustrates a block diagram of an RF modem configured for transmitting as well as simultaneously demodulating interfering digital signals on the same channel in the RF band in accordance with one embodiment of the present invention. The modem includes an analog front end 105, a parameter estimator module 110, a multiuser detection (MUD) module 115, a bank of decoders 117, a data formatting module 120, a control processor 125, a modulator 130, and a demultiplexer 135. The analog front end includes a number of antenna inputs, with each input associated with a tuner 105*a* and an analog-to-digital (A/D) converter 105*b*, and an amplifier 105*c*.

On the receiver side, wirelessly transmitted signals are received at the antenna diversity ports, processed through the analog front end 105, demodulated/recovered by modules 110, 115, and 117, and formatted by data formatting module 120. The resulting data signals 1-K are then provided to demultiplexer 135, which is adapted to select data signal m, the signal of interest (one of the data signals 1-K). This selected signal m is then provided to user m, for example, via a network or direct connections. The data formatting module 120 and the demultiplexer 135 operate pursuant to control input from the control processor 125.

On the transmitter side, the demultiplexer 135 receives transmission data m from the network/backbone or local host using a bidirectional line from user m. The data is modulated by module 130 in accordance with burst control provided by the control processor 125, amplified by amplifier 105c, and provided to the antenna output port for wireless transmission. In general, the control processor 125 controls the flow of data out of the modulator 130, thereby controlling when the modem transmits, and when the modem does not transmit for user m.

Note that each user 1-K has their own modem. Signals 1-K are received by one modem due to overpacking of the channel to exploit the bandwidth-efficient ability of the modem to receive and demodulate multiple interfering digital signals. The local control processor 125 deliberately causes interfering waveforms to be transmitted only when assigned to do so by a central access point, or only in cases where it has sensed the presence of exclusively bandwidth efficient modems transmitting and receiving at the same time. Otherwise, a legacy transmission mode is supported also, thereby providing backwards compatibility if the intended receiving modem is not configured to operate in accordance with the principles of the present invention.

RF Receiver—MUD Enabled

The antenna inputs may be from multiple polarizations or multiple locations or both in order to enhance the ability of the co-channel receiver to demodulate many interfering signals simultaneously. Note that D is the number of diversity ports, while K is the number of estimated co-channel interfering signals. The antenna inputs feed corresponding front end tuners 105a, each of which downconverts higher frequency signals into baseband signals or other relatively lower frequency signals prior to processing. At baseband, A/D converters 105b digitize each received signal into sampled data streams. Filtering, amplification, and other conventional processing, may also be implemented in the analog front end 105.

The sampled data streams are provided as inputs to the parameter estimation module 110, which is a synchronization device for interfering digital signals. The parameter estimation module 110 estimates the relative received timing offsets, phases, received amplitudes, and multipath structure for each of the interfering signals present in the received signal. The result of such parameter estimation is a matrix (S) of estimated composite signature waveforms for each of the K users, which is used by the MUD module 115 to help separate the channel signals.

The MUD module 115 uses the S matrix of estimated composite signature waveforms in addition to inputs from all A/D converters 105b to recover the data bits from the interfering signals as is conventionally done. The MUD module 115 supplies the recovered data bits as inputs to the formatting module 120, which operates as a buffering device and produces network data packets for each of the K interfering transmissions. The packet format depends on factors such as the given application and protocols being used by the communicating modems.

Note that the MUD module 115 is operatively coupled to a bank of decoders (1-K) 117, with each decoder communicatively coupled to a corresponding output of the MUD module 115. The bank of decoders receives a recovered symbol stream ($\hat{b}_1$ to $\hat{b}_K$) for each of the K users output by the MUD module 115, and provides error correction for each user by converting symbols to bits, comparing present bits to prior bits and/or subsequent bits, and then converting the bits back to symbols. Any number of various decoding algorithms can be employed here, such as Soft Viterbi or BCJR decoding. The result of such conventional error correction is a matrix (b(n)) of symbol estimates which are used by the MUD module 115 in the iterative process to provide better estimates of the particular symbols.

The iterative demodulation process carried out by modules 110, 115, and 117 for each user can be continued, for example, until a specified number of iterations is reached or until the difference between the compensated symbol estimates for the current and previous iterations are below a predefined threshold.

Each of the analog front end 105, parameter estimation module 110, MUD module 115, and bank of decoders 117 can be implemented in conventional technology. However, variations are also possible. For example, the parameter estimator 117 can be configured as described in U.S. patent application Ser. No. 10/228,787, titled, "Parameter Estimator for a Multiuser Detection Receiver." The MUD module 115 can be configured to operate as an MMSE MUD with prior information about the symbols as described in U.S. application Ser. No. 10/105,918, titled "System for Decreasing Processing Time in an Iterative Multi-User Detector System." Each of these applications is herein incorporated by reference in its entirety.

The data formatting module 120 is implemented in conventional technology, but is further adapted to operate in conjunction with the control processor 125. In particular, control processor 125 may be configured to select the formatting mode in which the data formatting module 120 operates. The formatting mode will depend on the network or backbone (e.g., ATM, PSTN, ISDN, personal computer) to which the modem is feeding the received data streams. The data formatter module 120 can be configured to support multiple types of format modes. The control processor 125 is configured to detect whether the wirelessly received data for each user k has been transmitted in accordance with the principles of the present invention, and also to detect which of the received data signals 1-K is the intended data signal m, based on packet header information provided by the data formatting module 120. The control processor 125 enables the corresponding transmission mode (e.g., legacy mode or bandwidth efficient mode in accordance with the present invention). The control processor 125 also executes the channel assignment arbitration sequences and data transmission timing sequences necessary to operate in accordance with the present invention.

The recovered data signals 1-K are output by the data formatting module 120, and provided to the demultiplexer 135, which selects the intended signal m based on input provided by the control processor 125. In one example embodiment, the control processor 125 receives packet header information for each of the received signals 1-K from the data formatting module 120. The packet header information of a data signal includes, among other information, the intended destination of that data signal. As such, the data signal intended for a particular modem can be identified, while the other received data signals can be ignored. Thus, the control processor 125 interrogates header information, and provides a control signal to the demultiplexer 135 that allows only the intended data signal m to be passed. In addition, the control processor 125 uses the packet headers of the interfering modems to determine which modems are sharing the channel. The source and destination addresses of the packet headers allow the control processor 125 to maintain logs of which modems are able to successfully transmit and receive data simultaneously. These logs facilitate adaptive scheduling techniques.

RF Transmitter

Data m is provided from the network/backbone or local host for user m to the demultiplexer 135, which buffers the outgoing data in preparation for providing it to the modulator 130, which operates under the control of the control processor 125. A number of access schemes (e.g., FDMA, TDMA, CDMA) and modulations (e.g., binary phase shift key, quadrature phase shift key, direct sequence spread spectrum, quadrature amplitude modulation, orthogonal frequency division multiplexing and pulse position modulation), can be implemented by the modulator 130. Transmission time is triggered by the burst control of control processor 125. The functionality of the control processor 125 will be discussed in reference to FIGS. 4-7. This control processor 125 can be implemented, for example, with a set of software instructions executing on a microprocessor, a digital signal processor, or other suitable processing environment. Alternatively, the control processor 125 can be implemented in special purpose built silicon (e.g., ASIC or FPGA).

Bandwidth Efficient Optical Modem

Figure 2:
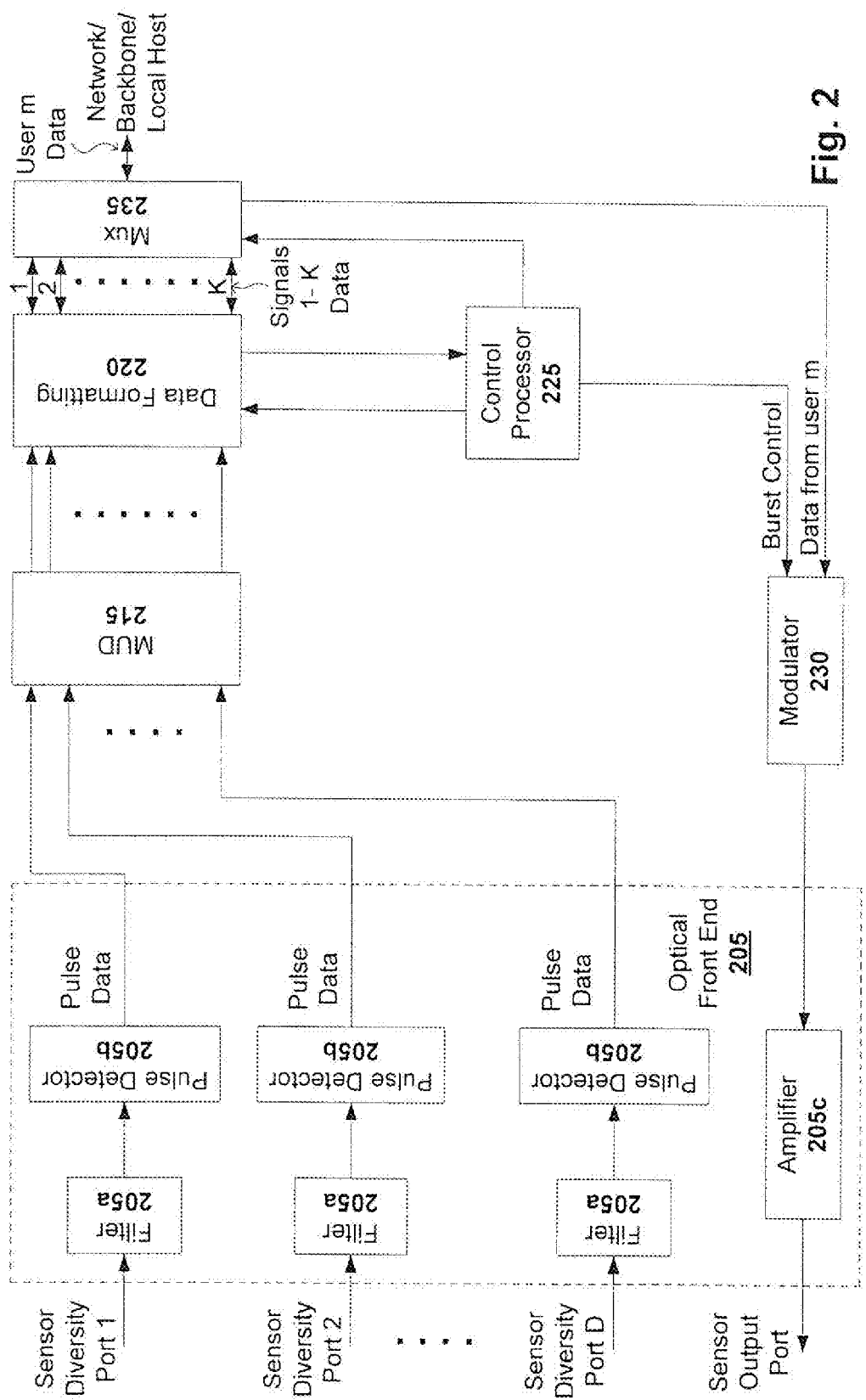
FIG. 2 illustrates a block diagram of a modem configured for demodulating/modulating co-channel signals in the optical/IR band in accordance with another embodiment of the present invention.

FIG. 2 illustrates a block diagram of an optical modem configured for transmitting as well as simultaneously demodulating interfering digital signals on the same channel in accordance with another embodiment of the present invention. The receiver includes an optical front end 205, an MUD module 215, a data formatting module 220, a control processor 225, a modulator 230, and a demultiplexer 235. The optical front end 205 includes a number of sensor inputs, with each input associated with a bandpass filter 205$a$ and a pulse detector 205$b$.

On the receiver side, optically transmitted signals are received at the sensor diversity ports, processed through the optical front end 205, demodulated/recovered by module 215, and formatted by data formatting module 220. The resulting data signals 1-K are then provided to the demultiplexer 235, which is adapted to select data signal m, the signal of interest as previously explained. The other signals are discarded as unwanted interference except where signaling information is used to operate the network protocol as described above. For example, the duration field is used to know when a given interfering signal will end its transmission. The selected signal m is then provided to user m, for example, via a network or direct connections. The data formatting module 220 and the demultiplexer 235 operate pursuant to the control processor 125.

On the transmitter side, the demultiplexer 235 receives transmission data m from the network/backbone or local host using a bidirectional line from user m, modulated by module 230 in accordance with burst control provided by the control processor 225, amplified by amplifier 205$c$, and provided to the sensor output port for optical transmission. As with the embodiment of FIG. 1, the control processor 225 controls the flow of data out of the modulator 230, thereby controlling when the modem transmits, and when the modem does not transmit for user m. A legacy transmission mode is supported also, thereby providing backwards compatibility if any of the remote modems with which this modem is communicating or sharing the time slot is not configured to operate in accordance with the principles of the present invention.

Optical Receiver—MUD Enabled

Sensor inputs may be from multiple polarizations or multiple locations or both in order to enhance the ability of the co-channel receiver to demodulate many interfering signals simultaneously. These sensor inputs feed front-end band-pass filters 205$a$ that feed the filtered signals to corresponding pulse detectors 205$b$. These detectors 205$b$ detect each received pulse, estimating its time of arrival and amplitude. Lasing, filtering, amplification, and other conventional optical processing, may also be implemented in the optical front end 205.

The pulse detection data streams are provided as inputs to the optical MUD module 215. The MUD module 215 uses pulse time of arrival and amplitude to resolve the interfering signals, and its principle of operation is further discussed in reference to FIG. 3. The MUD module 215 supplies the recovered data bits as inputs to a formatting module 220, which operates as a buffering device and produces network data packets for each of the K interfering transmissions. The packet format depends on factors such as the given application and protocols being used by the communicating modems. Note that, due to the nature of optical transmission, no parameter estimation or decoder modules are required here.

The optical front end 205 and MUD module 215 can be implemented in conventional technology. The data formatting module 220 can also be implemented in conventional technology, but is further adapted to operate in conjunction with the control processor 225 as previously discussed in reference to FIG. 1. Recall the data formatter module 220 can be configured to support multiple types of format modes. The control processor 225 is configured to detect whether the optically received data for each user k has been transmitted in accordance with the principles of the present invention, and also to detect which of the received data signals 1-K is the intended data signal m, based on packet header information provided by the data formatting module 220. The control processor 225 enables the corresponding transmission mode (e.g., legacy mode or bandwidth efficient mode in accordance with the present invention).

The recovered data signals 1-K are output by the data formatting module 220, and provided to the demultiplexer 235, which selects the intended signal m based on input provided by the control processor 225 as previously explained.

Optical Transmitter

Data m is provided from the network/backbone or local host for user m to the demultiplexer 235, which buffers the outgoing data in preparation for providing it to the modulator 230, which operates under the control of the control processor 225. A number of access schemes (e.g., FDMA, TDMA, CDMA) and modulations (e.g., pulse position modulation, on-off keyed, quadrature amplitude modulation) can be implemented by the modulator 230. Transmission time is triggered by the burst control of control processor 225. The functionality of the control processor 225 will be discussed in reference to FIGS. 4-7. As previously discussed, the control processor can be implemented in software, hardware, firmware, and any combination thereof. For example, control processor 225 can be implemented with a set of software instructions executing on a microprocessor, a digital signal processor, or other suitable processing environment. Alternatively, the control processor 225 can be implemented in special purpose built silicon (e.g., ASIC or FPGA).

Optical Mud Module

Figure 3:
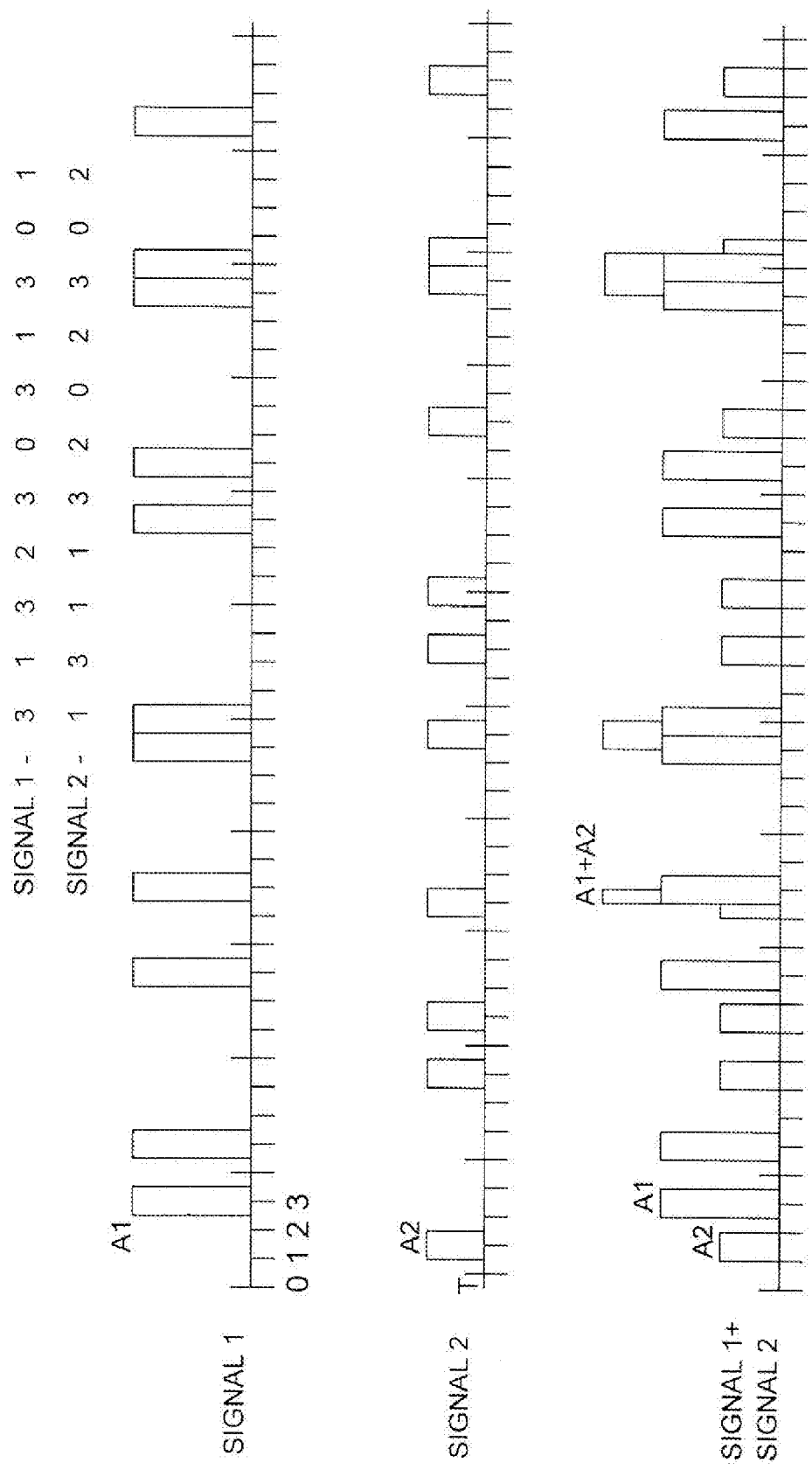
FIG. 3 illustrates how an optical MUD device resolves interfering optical waveforms in the radiofrequency band in accordance with one embodiment of the present invention.

FIG. 3 shows the principle of operation underlying an optical MUD module 210 of FIG. 2 with an example of two interfering optical signals. The first line shows amplitude as a function of time for the first of two interfering radiated signals (signal 1). It can be seen that idealized square pulses are radiated at constant amplitude A1. In pulse position modulation (PPM), the position of each pulse determines the data transmitted. By measuring the time of arrival relative to the last pulse, it is possible to assign one or more bits to the symbol depending on the timing resolution of the corresponding pulse detector 205$b$.

For simplicity, the example shows a 4-state pulse detector 205$b$, where pulses can arrive at four different values relative to one another, corresponding to two bits per symbol. The horizontal axis is marked with symbol frame intervals (long lines) and sampling times (short lines). All time indices begin with zero. For example, the first pulse of signal 1 arrives during sampling time three in the frame, corresponding to a 'three' or a '11' in a simple symbol encoding. The next pulse arrives during sampling time one of the next frame, corresponding to a 'one' or a '01' in a simple symbol encoding. Note that while the data is encoded in the time of arrival, each pulse arrives with the same amplitude A1.

The second line shows amplitude as a function of time for the second of two interfering radiated signals (signal 2). Again, there are idealized square pulses radiated at some different constant amplitude A2. The pulses also arrive at a different symbol phase relative to the first set of pulses as indicated by the 'T'. The third line shows the situation when both signal 1 and signal 2 radiate a sensor port at the same time. Now four possible amplitudes are received: A1, A2, A1+A2 and 0.

Using an intensity level detector to implement each of the pulse detectors 205b, it is possible to generate not only the pulse time of arrival, but also its amplitude. By sorting through this data, the interfering pulse streams may be separated out. Using the differing symbol phases of signal 1 and signal 2 will further improve the demodulator's ability to separate the interfering signals. Polarization data could also be used. These pulse deinterleaving techniques are well-known in the art. In addition, diversity reception may be employed by having multiple input sensors to the MUD module 215 as shown in FIG. 2. Note that perfectly square pulses are illustrated in FIG. 3, and are an idealization for illustration purposes. The actual pulse shape will approximate the ideal sufficiently well for required performance, assuming sufficiently high SNR.

Bandwidth Efficient Protocol—AP Configuration

Figure 4A:
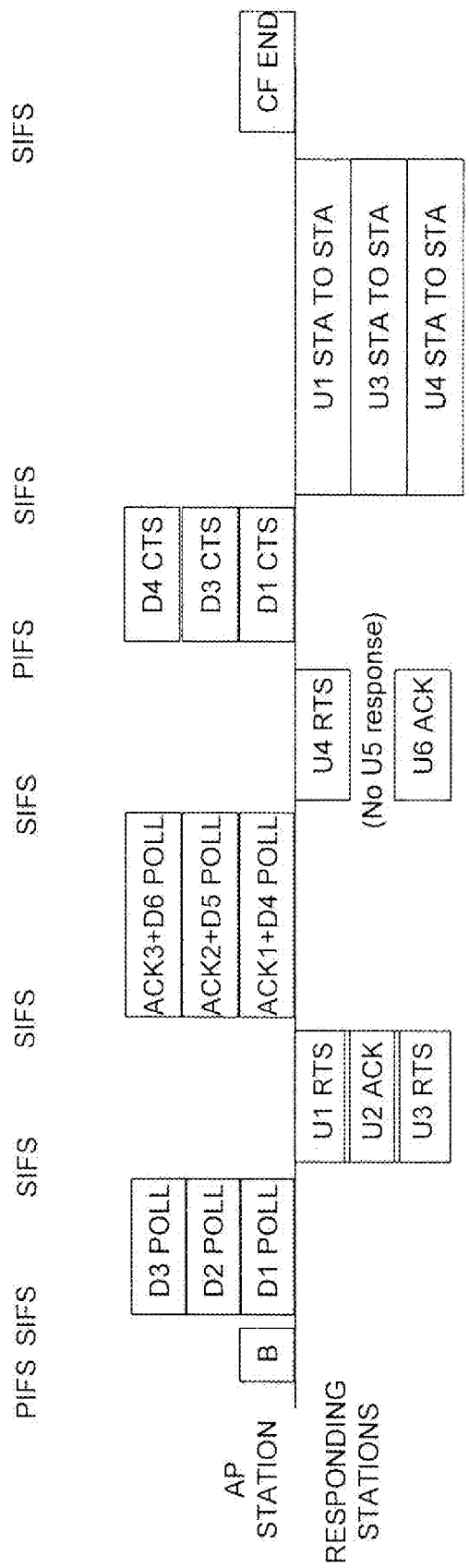
FIG. 4a illustrates a timing diagram for polling and scheduling by a centralized network element employing co-channel demodulation using a bandwidth efficient network modem to increase network capacity and reliability in accordance with one embodiment of the present invention.

FIG. 4a shows the timing diagram for polling and scheduling by a centralized network element configured for a network employing bandwidth efficient modems configured in accordance with an embodiment of the present invention. This functionality can be carried out, for example, by the control processor of a modem configured as shown in FIGS. 1 and 2 (modules 125 or 225), where that particular modem is designated as a polling point coordinator access point (AP/ PC) element. Comparison can be made to FIGS. 16a-b, which show the timing diagram for polling and scheduling by a centralized network element using conventional modems.

In this particular example, terminals 1, 3, and 4 request-to-send and later transmit data, terminals 2 and 6 send back ACK with no data, and terminal 5 misses poll. In FIG. 4a, it is assumed for simplicity that all modems have the ability to recover data signals in the presence of two interfering signals. In this case, the contention-free period begins as in FIG. 16 with the beacon signal (B). This signal is immediately followed by transmission of simultaneous polling signals (D1 POLL, D2 POLL, D3 POLL) to three terminals. Since the central network element (AP STATION) transmits the three signals simultaneously, the three signals are generated from a single functional element using an optimal phase relationship for signal recovery.

At the end of the guard interval, all three terminals (stations 1, 2, and 3) transmit back simultaneously (U1 RTS, U2 ACK, U3 RTS). Using the co-channel demodulation capabilities of the bandwidth efficient modem, the central network element (AP STATION) recovers all three interfering signals. In the example of FIG. 4a, two of the three polled terminals have requested network access (stations 1 and 3, by virtue of their RTS responses).

At the end of the guard interval, the central element (AP STATION) transmits simultaneously ACK signals to the first three terminals, followed immediately by polling signals to the next set of three terminals (ACK1+D4 POLL, ACK2+D5 POLL, ACK3+D6 POLL). At the end of the guard interval, two terminals (stations 4 and 6) transmit back simultaneously (U4 RTS, U6 ACK) while one terminal (station 5) fails to respond. One of the terminals requests network access (station 4, by virtue of its RTS response), making a total of three out of the first six terminals polled.

The central network element (AP STATION) then sends back clear-to-send messages (D1 CTS, D3 CTS, D4 CTS) to the three requesting terminals. At the end of the guard interval, all three terminals (stations 1, 3, and 4) simultaneously transmit messages to other terminals in the network. Polling and transmission continues in this manner until the end of the contention free period frame. At this point, the central network element (AP STATION) transmits a message (CF END) to signal the end of the period. It can be seen from the diagram, that network throughput has been tripled by the three-fold parallelism in comparison to the ordinary modem case of FIG. 16.

Backwards Compatibility for Legacy Terminals

Figure 4B:
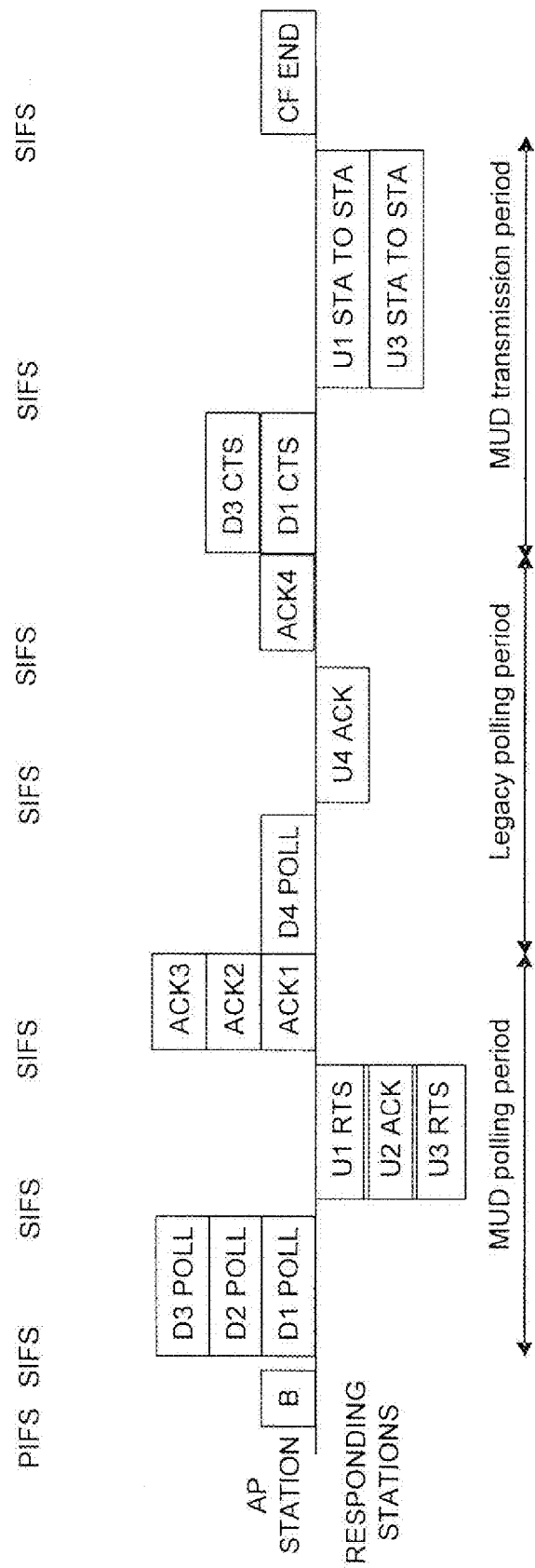
FIG. 4b illustrates a timing diagram for polling and scheduling by a centralized network element employing co-channel demodulation to increase network capacity and reliability while accommodating legacy network terminals unable to employ co-channel demodulation in accordance with one embodiment of the present invention.

FIG. 4b demonstrates how polling and scheduling by a centralized network element (AP STATION) are modified for the case where a network employs legacy terminals not having bandwidth efficient modems in accordance with the principles of the present invention. In this case, the contention-free period (CFP) is subdivided into bandwidth efficient MUD polling periods and legacy polling periods. In this particular example, legacy terminal U4 uses a dedicated legacy polling slot, while other terminals (U1, U2, and U3) have bandwidth efficient modems that use the bandwidth efficient MUD polling periods.

During the bandwidth efficient periods, communication is as described in reference to FIG. 4a, exploiting the parallelism possible with co-channel demodulation (MUD). During the legacy period, communication is as described in reference to FIGS. 16a-b—one terminal per channel at any given time. It will be apparent to one of ordinary skill in the art to generalize FIGS. 4a and 4b to cases where N terminals are able to communicate in parallel.

Figure 5:
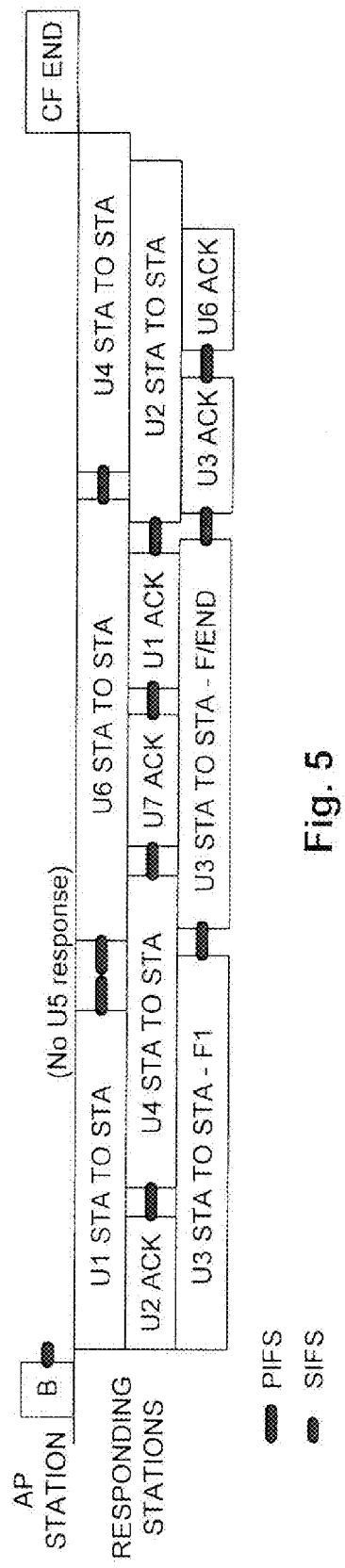
FIG. 5 illustrates a timing diagram for polling and scheduling by a centralized network element employing co-channel demodulation to increase network capacity and reliability thereby eliminating RTS/CTS scheduling overhead in accordance with one embodiment of the present invention.

It is possible in some networks that different combinations of terminals are able to communicate successfully at the same time. Through long-term network operation, the central network element (AP STATION) can collect statistics on successful simultaneous packet transmissions. These statistics, which can be stored in a memory accessible by the control processor, can be used to optimally schedule combinations of two, three, or more terminals as propagation and SNR allow. In this respect, the network throughput increases over time through adaptive scheduling by the central network element (AP STATION). Numerous schemes which leverage historical data for learning and optimization purposes will be apparent in light of this disclosure Reduced Overhead FIG. 5 shows a further refinement of the protocol demonstrated in FIG. 4a when RTS/CTS overhead is eliminated. Recall that RTS/CTS signaling is used to increase robustness of networks associated with hidden terminals and other interference problems. In cases where bandwidth efficient modems successfully tolerate network interference, the RTS/ CTS signaling overhead is an unnecessary cost.

Here, terminals (RESPONDING STATIONS) know their priority in the queue and broadcast in the next available time slot. In this particular example, three terminals can transmit in the channel at the same time. Each available terminal broadcasts its data in the channel pursuant to an assigned terminal priority. The terminal priority may be, for example, assigned based on a random number generation, or on a first come, first served or round robin scheme.

After the beacon frame (B), terminal 1 (U1) immediately begins broadcasting (U1 STA TO STA) in the channel. In addition, terminal 2 (U2) broadcasts an ACK (U2 ACK) to release the channel to the next priority terminal. Terminal 3 (U3) is the third terminal broadcasting in the channel. Note that terminal 3 sends a two-fragment message (U3 STA TO STA—F1 followed by U3 STA TO STA—F/END) since its data is too long for a single frame.

Terminal 4 begins broadcasting (U4 STA TO STA) in the channel as soon as terminal 2 releases the channel, as indicated by a guard interval (e.g., quiet period). After terminal 1 releases the channel, terminal 5 (U5) does not respond, thereby forfeiting use of the channel to terminal 6 (U6), which broadcasts its data (U6 STA TO STA) in the channel after waiting for a specified guard interval. After terminal 4 releases the channel, terminal 7 (U7) indicates that it does not need the channel (U7 ACK) and releases the channel. Terminal 1 then indicates that it does not need the channel (U1 ACK) and releases it as well. Terminal 2 is then allowed to broadcast its data (U2 STA TO STA) in the channel. Thus, at any given time, up to three terminals can be broadcasting in the channel at the same time. As one terminal releases the channel, the next priority terminal can access the channel or simply forfeit its turn to the next priority terminal.

Use of channel continues based on terminal priorities until the end of the frame. A further refinement would be, for example, eliminating the ACK requirement before channel release. It can been seen by comparison with FIG. 4a that this method further increases throughput in two ways. First, the time needed for polls and acknowledgements is removed. In addition, the send time needed for RTS and CTS signals is removed. The improvement may be calculated in terms of the percentage of terminals polled and responding that no request was needed, and in terms of the ratio of time spent on RTS/CTS relative to the time spent actually transmitting data packets.

Bandwidth Efficient Protocol—Distributed Coordination Function Configuration

FIG. 6 shows how bandwidth efficient terminals configured in accordance with the principles of the present invention also improve network access in cases where no centralized network element is employed—the distributed coordination function (DCF) case. In the example shown in FIG. 6, two terminals (SOURCE 1 and SOURCE 2) simultaneously transmit requests to send (RTS) packets. This can happen inadvertently, for example, due to the hidden terminal problem. Alternatively, it can happen deliberately because both terminals have detected that most terminals in the network are bandwidth efficient and are executing the protocol with more aggressive access than possible with non-bandwidth efficient modems, by exploiting the capability to recover data transmissions in the presence of interfering signals.

In either case, a conventional pair of terminals would be unable to recover the data, would detect the collision and be forced to resend after at least the length of time necessary for a random back-off protocol. It may also be necessary to wait the length of time required to wait for an ACK from the receiving terminals. When no such ACK is received, the terminals would know that the collision occurred and initiate the random back-off protocol. In either case, much time is lost due to the collision.

In contrast, with bandwidth efficient modems configured as described herein, both terminals are able to recover data simultaneously. No collision and no delays occur. Instead, both receiving terminals (DEST 1 and DEST 2) send back clear-to-send (CTS) packets. Upon receipt of these packets, both transmitting terminals transmit their packets (DATA 1 and DATA 2) simultaneously. The packets may be different lengths as shown in the example.

At the end of the transmission, the network is available for use by any terminals, exactly as is the case in FIG. 12. For the simultaneous transmissions to successfully transpire according to the timing shown in FIG. 6, both transmitting terminals and both receiving terminals must contain bandwidth efficient modems configured as described herein. However, it is not necessary for other terminals in the network to be bandwidth efficient.

Mechanisms exist within legacy terminals for detecting activity at given times on the network through means such as received signal strength indication. Thus, bandwidth efficient modems configured in accordance with embodiments of the present invention can be added to networks with legacy terminals without disrupting operation. Over time, bandwidth efficient modems operating in a network will learn which terminals are able to receive data in the presence of interfering packets. This learning can be accomplished by, for example, maintaining statistics on success rates on attempted co-channel transmissions. After an adaptive learning period, bandwidth efficient terminals will only transmit in co-channel mode to other terminals that are known to be configured as efficient bandwidth modems and therefore able to recover the co-channel data.

One method for implementing this learning period would be to program bandwidth efficient modems in accordance with the principles of the present invention to refrain from simultaneous broadcasting during certain time sub-intervals to ensure that legacy terminals can transmit during some time slots. Over time, the bandwidth-efficient modems can use co-channel reception statistics to determine which other modems can receive interference. This information is computed by demodulating packet addresses and maintaining counts of the percentage of successful transmissions to that recipient in the presence of interference.

Methodology

Figure 7A:
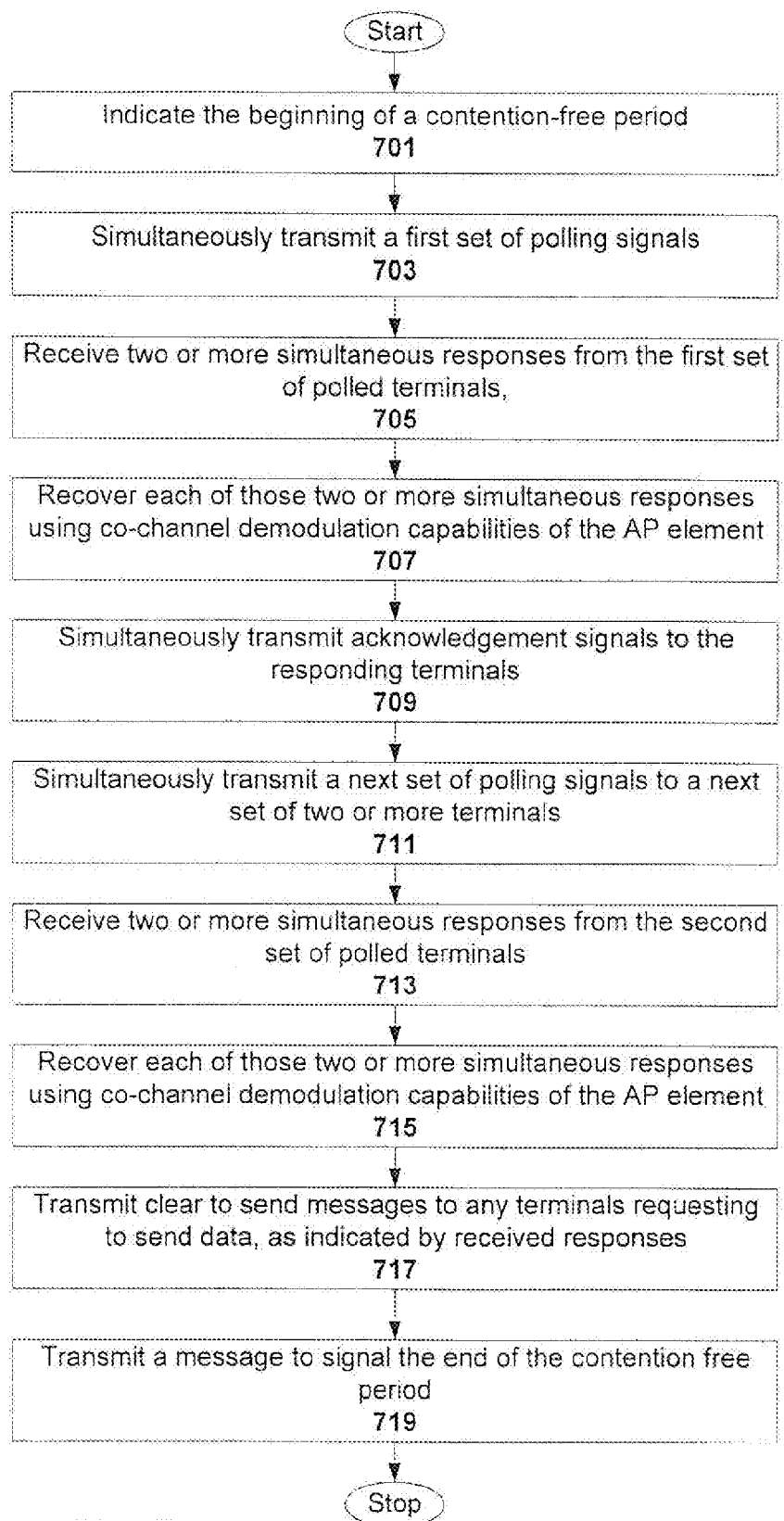
FIG. 7a illustrates a method for polling and scheduling in a communication network that includes multiple users and a plurality of bandwidth efficient modems in accordance with one embodiment of the present invention.

FIG. 7a illustrates a method for polling and scheduling in a communication network that includes multiple users and three or more bandwidth efficient modems in accordance with one embodiment of the present invention. This method can be carried out, for example, by a modem configured as discussed in reference to FIGS. 1 and 2, where that particular modem is designated as a polling point coordinator access point (AP) element.

The method begins with indicating 701 the beginning of a contention-free period. In one embodiment, this indication is provided by transmitting a beacon signal (B). The method proceeds with simultaneously transmitting 703 a first set (two or more) of polling signals, where each polling signal corresponds to a particular terminal included in a first set of terminals included in the network. In one embodiment, the polling signals are generated by the AP element using an optimal phase relationship to facilitate signal recovery.

After transmission of the polling signals is completed (e.g., as detected by the end of a guard interval), the method proceeds with receiving 705 two or more simultaneous responses from the first set of polled terminals, and recovering 707 each of those two or more simultaneous responses using co-channel demodulation capabilities of the AP element. The responses may include, for example, ACK and/or RTS as previously explained. At the end of a guard interval indicating the receipt of the two or more simultaneous responses, the method may further proceed with simultaneously transmitting 709 acknowledgement signals to the responding terminals, followed by simultaneously transmitting 711, a next set of polling signals to a next set of two or more terminals. Note that transmitting steps 709 and 711 can be effectively combined into a single step (e.g., ACK 1+D4 POLL).

The method proceeds (e.g., at the end of a guard interval) with receiving 713 two or more simultaneous responses from the next set of polled terminals, and recovering 715 each of those two or more simultaneous responses using co-channel demodulation capabilities of the AP element. The method proceeds with transmitting 717 clear-to-send messages to any terminals requesting to send data, as indicated by received responses. Those terminals may then (e.g., at the end of a guard interval) simultaneously transmit messages to other terminals in the network.

Polling and transmission may continue in this manner until the end of the contention free period frame. In one such embodiment, the method further includes monitoring (with the AP element) the channel, and transmitting CTS messages to queued terminals when currently transmitting terminals complete data transmission. In response to no terminals being queued, the method goes back to step 703, where the AP element polls more elements in the network. Note that the same channel may be used, or a different channel. Further note that the transmitting 717 of the CTS messages may occur directly after the receiving 705 and recovering 707 steps, thereby eliminating steps 709 to 715 (i.e., only one set of polling signals is transmitted, and one set of corresponding responses is received). Alternatively, there may be any number of subsequent 709-715 steps prior to step 717. After the terminal transmission period (e.g., as indicated by a guard interval), the method may further include transmitting 719 a message to signal the end of the contention free period.

The indicating and transmitting steps (701, 703, 709, 711, 717, and 719) can be carried out, for example, by the control processor (125 and 225), while the receiving and recovering steps (705, 707, 713, and 715) can be carried out by the MUD module (115 and 215). Variations on this example embodiment, as well as the supporting roles of the front end (105 and 205), modulator (130 and 230), and other componentry (e.g., 110, 117) will be apparent in light of this disclosure.

Figure 7B:
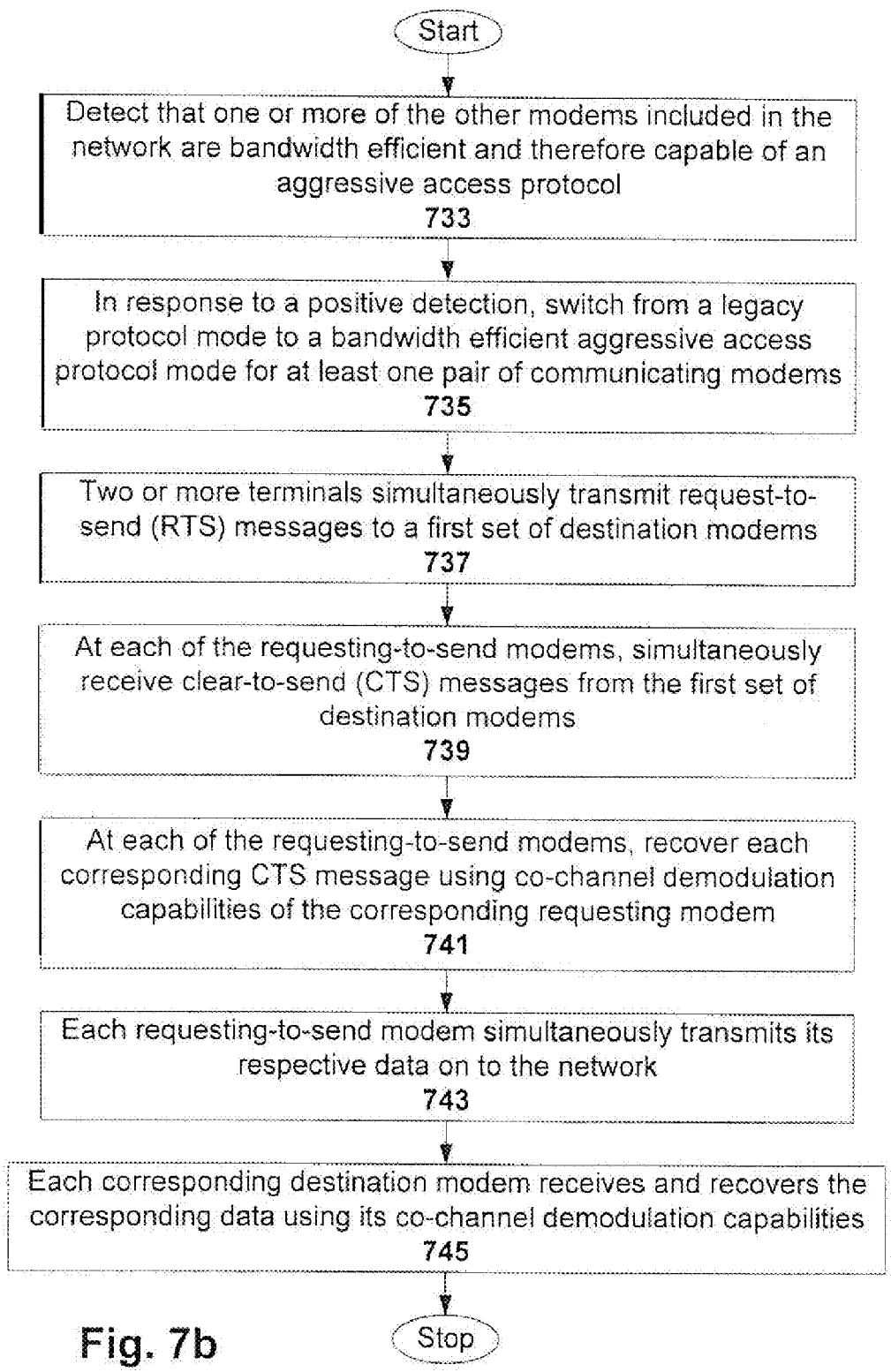
FIG. 7b illustrates a method for polling and scheduling in a communication network that includes multiple users and a plurality of bandwidth efficient modems in accordance with another embodiment of the present invention.

FIG. 7b illustrates a method for polling and scheduling in a communication network that includes multiple users and a plurality of bandwidth efficient modems in accordance with another embodiment of the present invention. This method can be carried out, for example, in a network having four or more modems each configured with a control processor as discussed in reference to FIGS. 1 and 2 (modules 125 or 225), where there is no centralized network element, referred to herein as the distributed coordination function (DCF) case.

The method begins with two or more terminals simultaneously transmitting 737 requests-to-send (RTS) messages to a first set of destination modems. This can happen inadvertently due to propagation and collisions or intentionally as previously explained. In either case, the method may further include preliminary steps, with each modem detecting 733 that one or more of the other modems included in the network are bandwidth efficient and therefore capable of an aggressive access protocol, and switching 735 from a legacy protocol mode to a bandwidth efficient aggressive access protocol mode for at least one pair of communicating modems included in the network.

These preliminary steps may be eliminated, for example, as part of an adaptive scheme where modems of the network learn the modes of operation (e.g., legacy and bandwidth efficient aggressive access protocol in accordance with the present invention) which each particular modem in the network is capable. Thus, while a legacy mode could be the default mode, an automatic switch to a bandwidth efficient aggressive access protocol mode could be made once all of receiving and transmitting modems communicating in an established link are identified and known to support that mode.

The method proceeds with simultaneously receiving 739 clear-to-send (CTS) messages from the first set of destination modems at each of the requesting-to-send modems of step 737, and recovering 741 each corresponding CTS message using co-channel demodulation capabilities of the corresponding requesting modem. The method then proceeds with each requesting modem simultaneously transmitting 743 its respective data on to the network, and each corresponding destination modem receiving and recovering 745 the corresponding data using its co-channel demodulation capabilities (e.g., an optical or linear MMSE MUD algorithm). The method of FIG. 7b may be repeated as necessary when data becomes available for transmission.

The detecting, switching, and transmitting steps (733, 735, 737, and 743) can be carried out, for example, by the control processor (125 and 225), while the receiving and recovering steps (739, 741, and 745) can be carried out by the MUD module (115 and 215). Variations on this example embodiment, as well as the supporting roles of the front end (105 and 205), modulator (130 and 230), and other componentry (e.g., 110, 117) will be apparent in light of this disclosure.

Figure 7C:
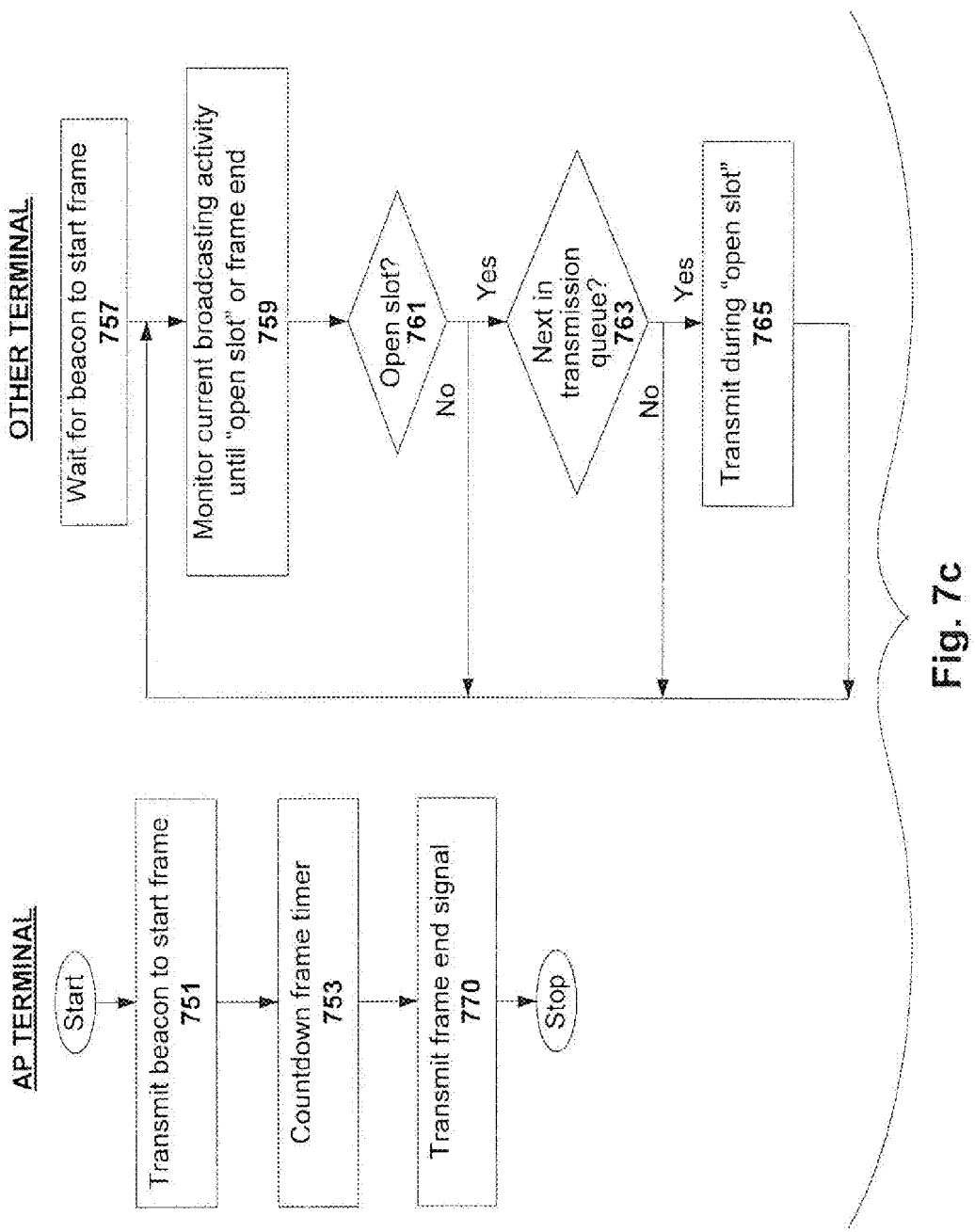
FIG. 7c illustrates a method for polling and scheduling in a communication network that includes multiple users and a plurality of bandwidth efficient modems in accordance with another embodiment of the present invention.

FIG. 7c illustrates a method for polling and scheduling in a communication network that includes multiple users and three or more bandwidth efficient modems in accordance with another embodiment of the present invention. This method on the left side of the figure can be carried out, for example, by a modem configured as discussed in reference to FIGS. 1 and 2, where that particular modem is designated as a polling point coordinator access point (AP) element. The method on the right side of the figure can also be carried out by the other terminals in the network, which can also be configured as discussed in reference to FIGS. 1 and 2. This particular embodiment eliminates the need for RTS/CTS signaling overhead.

The ability to handle co-channel interference without losing long time intervals due to collision resets allows for much simpler and more efficient communication schemes (as discussed in reference to FIG. 5). In this example, the AP terminal acts like a global timer. It broadcasts 751a beacon signal to indicate frame start. Then it counts 753 the frame interval before sending 770 a global signal to end the frame. Frames are desirable here, as they provide a means to maintain global network timing, and further provide for reset from race conditions.

In this example, each terminal communicatively coupled with the AP terminal accesses time slots in round robin fashion. Terminals maintain records of their place in the queue based on the round robin scheme. Alternatively, access priority information could be broadcast by the AP terminal as part of the beacon packet. Each terminal waits 757 for the beacon signal to indicate frame start. Since each terminal is able to recover data from all other terminals broadcasting simultaneously, each terminal monitors 759 which terminals are currently broadcasting. When a slot opens up 761, each terminal knows whether or not it is first in the queue 763 (e.g., based on the round robin scheme, where each modem included in the network is assigned a transmission priority). The terminal that is first in the queue broadcasts 765 in the empty slot. Round robin access continues until the end of the frame.

Thus, both AP and DCF configurations can employ the principles of the present invention. In either case, the method may further include supporting legacy modem communication when a bandwidth efficient aggressive access protocol mode in accordance with the present invention is not enabled for one or both of a pair of communicating modems. In addition, the method may further include adaptively learning which modems included in the network support the bandwidth efficient aggressive access protocol mode, and storing the learned information for access by modems of the network. The storage (e.g., RAM or flash memory) may be local to each modem, or a central storage located on the network.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A modem which enables efficient use of bandwidth in a multiuser wireless network including a plurality of modems in the presence of interference and noise, the modem comprising:
   a multiuser detection (MUD) module configured to simultaneously demodulate and recover K wirelessly transmitted signals using co-channel demodulation;
   a data formatting module operatively coupled to the multiuser detection module, and configured to produce network data packets for at least one of the K recovered signals;
   a control processor operatively coupled to the formatting module, and configured to detect with which protocol mode the at least one of the K recovered signals was transmitted, and to enable a corresponding transmission mode including one of a legacy protocol mode and a bandwidth efficient aggressive access protocol mode that exploits co-channel demodulation capabilities of the modem, wherein the signals of the one of a legacy protocol mode can be selected from the group consisting of low data rate BPSK, QPSK, GMSK and OAM; and
   a demultiplexer operatively coupled to the data formatting module and the control processor, and configured to select one of the recovered K wirelessly transmitted signals as a target signal intended for a user associated with the modem, where the selection is based on a control input from the control processor, wherein the data formatting module supports multiple types of format modes, and the control processor is configured to select a network data packet formatting mode in which the data formatting operates.

2. The modem of claim 1, further comprising a front end configured to simultaneously receive the K wirelessly transmitted signals, and to provide those signals to the MUD and a parameter estimator in a form that facilitates their subsequent processing by the multiuser detection module.

3. The modem of claim 1, wherein in response to the control processor knowing that a modem with which it is communicating does not support the bandwidth efficient aggressive access protocol mode, the control processor is further adapted to enable a legacy protocol mode.

4. The modem of claim 1, further comprising a parameter estimator module receiving D analog to digital (A/D) converters, the parameter estimator module outputting an S matrix to the MUD module, wherein the S matrix comprises estimated composite signature waveforms.

5. The modem of claim 1, further comprising a bank of K decoders communicating with the K MUD module outputs, the bank of K decoders producing a matrix bn output to the MUD module from the input of K MUD module recovered signals, wherein the matrix bn is a matrix of symbol estimates.

6. The modem of claim 1, wherein the control processor is configured to detect whether wirelessly received data for each user K has been transmitted in accordance with a simultaneously transmitted single channel polling bandwidth efficient aggressive access protocol mode.

7. The modem of claim 1, wherein the control processor detects which of the received data signals 1-K is the intended data signal m, based on packet header information provided by the data formatting module.

8. The modem of claim 1, wherein the control processor also executes channel assignment arbitration sequences and data transmission timing sequences to operate in accordance with a beacon signal polling and scheduling bandwidth efficient aggressive access protocol mode.

9. The modem of claim 1, wherein the data formatting module provides packet header information to the control processor for each of the received signals 1-K, whereby a data signal intended for a particular modem can be identified, while other received data signals can be ignored.

10. A modem which enables efficient use of bandwidth in a multiuser wireless network including a plurality of modems in the presence of interference and noise, the modem comprising:
   a multiuser detection (MUD) module receiving D inputs from D analog to digital (A/D) converters configured to simultaneously demodulate and recover K wirelessly transmitted signals using co-channel demodulation, simultaneously outputting K recovered signals;
   a parameter estimator module receiving the D inputs from the D A/D converters;
   a bank of K decoders communicating with the K MUD module outputs, the bank of K decoders producing a bn output to the MUD module from the input of K MUD module recovered signals;
   a data formatting module operatively coupled to the parallel K MUD module outputs of the MUD module, and configured to produce network data packets of the parallel K recovered signals, the parallel K recovered signal data packets communicated to a demultiplexer, wherein the data formatting module supports multiple types of network packet format modes;
   the demultiplexer operatively coupled to the data formatting module, receiving the parallel K recovered signal data packets, and configured to select one of the recovered K wirelessly transmitted signals as a target signal intended for a user, m, associated with the modem, and to communicate m data packets of the K recovered signal data packets to a recipient, where the selection is based on a control input from a control processor;
   the control processor operatively coupled to the demultiplexer and the data formatting module, and configured to detect with which protocol mode the at least one of the K recovered signals was transmitted, based on input from the data formatting module, and to enable a corresponding transmission mode including one of a legacy protocol mode and a bandwidth efficient aggressive access protocol mode that exploits co-channel demodulation capabilities of the modem, the control processor also configured to select a network data packet formatting mode in which the data formatting operates a modulator operatively coupled to the control processor, the control processor enabling the transmission mode of the modulator, the transmission mode corresponding to the protocol mode in which the at least one of the K recovered signals was transmitted; and an amplifier operatively coupled to the modulator, the amplifier in communication with at least one antenna output port.

11. The modem of claim 10, further comprising:
a front end receiver block comprising a plurality, D, of antenna diversity ports, a plurality of D tuners, and the plurality of D A/D converters;
the plurality, D, of antenna diversity ports communicating, respectively, with D antennas;
the plurality of D tuners communicating, respectively, with the D antenna diversity ports;
the plurality of D A/D converters communicating, respectively, with the D tuners, each outputting a baseband waveform, respectively corresponding to each of the D antenna diversity ports.

12. The modem of claim 10, wherein the m data packets of the K recovered signal data packets are formatted for and provided to a network, where the selection is based on a control input from the control processor.

13. The modem of claim 10, wherein the m data packets of the K recovered signal data packets are formatted for and provided to a backbone, where the selection is based on a control input from the control processor.

14. The modem of claim 10, wherein the m data packets of the K recovered signal data packets are formatted for and provided to a local host, where the selection is based on a control input from the control processor.

15. The modem of claim 10, wherein the data formatting module provides packet header information to the control processor for each of received signals 1-K.

16. The modem of claim 15, wherein the packet header information of a data signal comprises intended destination of that data signal, whereby the data signal intended for a particular modem can be identified, while other received data signals are ignored.

17. The modem of claim 10, wherein a legacy default mode is default operating mode, and an automatic switch to a non-default bandwidth efficient aggressive access protocol mode is made once all of receiving and transmitting modems communicating in an established link are identified and known to support the non-default bandwidth efficient aggressive access protocol mode.

18. The modem of claim 10, wherein the modem is a polling point coordinator access point (AP) element or in a distributed coordination function (DCF) configuration, wherein the AP serves as a global timer; and the DCF provides best-effort delivery of asynchronous packet data.

19. The modem of claim 10, wherein the modem supports both polling point coordinator access point (AP) and distributed coordination function (DCF) configurations, wherein the DCF employs Carrier Sense Multiple Access with Collision Avoidance (CSMA/CA), whereby the modem transmits and receives at the same time.

20. A modem which enables efficient use of bandwidth in a multiuser wireless network including a plurality of modems in the presence of interference and noise, the modem comprising:
a front end receiver block comprising a plurality, D, of antenna diversity ports, a plurality of D tuners, and a plurality of D analog to digital (A/D) converters;
the plurality, D, of antenna diversity ports communicating, respectively, with D antennas;
the plurality of D tuners communicating, respectively, with the D antenna diversity ports;
the plurality of D A/D converters communicating, respectively, with the D tuners, each outputting a baseband waveform, respectively corresponding to each of the D antenna diversity ports;
a multiuser detection (MUD) module receiving D inputs from the D A/D converters, wherein the MUD module is configured to simultaneously demodulate and recover K wirelessly transmitted signals using co-channel demodulation, simultaneously outputting K recovered signals;
a parameter estimator module receiving the D inputs from the D A/D converters, wherein the parameter estimator estimates the relative received timing offsets, phases, received amplitudes, and multipath structure for each of the interfering signals present in the received signal, outputting parameter estimation matrix S to the MUD module;
a bank of K decoders communicating with the K MUD module outputs, the bank of K decoders producing a bn output to the MUD module from the input of K MUD module recovered signals;
a data formatting module operatively coupled to the parallel K MUD module outputs of the MUD module, and configured to produce network data packets of the parallel K recovered signals, the parallel K recovered signal network data packets communicated to a demultiplexer, wherein the data formatting module supports multiple types of network data packet format modes;
the demultiplexer operatively coupled to the data formatting module, receiving the parallel K recovered signal network data packets, and configured to select one of the recovered K wirelessly transmitted signals as a target signal intended for a user, m, associated with the modem, and to communicate m data packets of the K recovered signal data packets to a recipient, where the selection is based on a control input from a control processor;
the control processor operatively coupled to the demultiplexer and the data formatting module, and configured to detect with which protocol mode the at least one of the K recovered signals was transmitted, based on input from the data formatting module, and to enable a corresponding transmission mode including one of a legacy protocol mode and a bandwidth efficient aggressive access protocol mode that exploits co-channel demodulation capabilities of the modem, wherein the signals of the one of a legacy protocol mode comprise low data rate BPSK or QPSK, or BPSK and QPSK, the control processor also configured to select a network data packet formatting mode in which the data formatting operates;
a modulator operatively coupled to the control processor, the control processor providing a burst control input, enabling a transmission mode of the modulator, the transmission mode corresponding to the protocol mode in which the at least one of the K recovered signals was transmitted, and an input of data from the user m from the demultiplexer; and
an amplifier operatively coupled to the modulator, the amplifier in communication with at least one antenna output port.

* * * * *